United States Patent
Lee et al.

(10) Patent No.: US 11,188,710 B2
(45) Date of Patent: Nov. 30, 2021

(54) INLINE CONTENT ITEM EDITOR COMMANDS

(71) Applicant: Dropbox, Inc., San Francisco, CA (US)

(72) Inventors: Jennifer Lee, San Francisco, CA (US); Shuaihang Wang, San Mateo, CA (US)

(73) Assignee: Dropbox, Inc., San Francisco, CA (US)

( * ) Notice: Subject to any disclaimer, the term of this patent is extended or adjusted under 35 U.S.C. 154(b) by 122 days.

(21) Appl. No.: 15/421,286

(22) Filed: Jan. 31, 2017

(65) Prior Publication Data
US 2018/0189250 A1 Jul. 5, 2018

Related U.S. Application Data

(60) Provisional application No. 62/441,006, filed on Dec. 30, 2016.

(51) Int. Cl.
*G06F 40/00* (2020.01)
*G06F 40/166* (2020.01)
*G06Q 10/10* (2012.01)

(52) U.S. Cl.
CPC ......... *G06F 40/166* (2020.01); *G06Q 10/101* (2013.01)

(58) Field of Classification Search
CPC ................. G06F 17/24; G06F 17/2765; G06F 17/30867; G06F 40/166; G06Q 10/101
See application file for complete search history.

(56) References Cited

U.S. PATENT DOCUMENTS

| | | | | | |
|---|---|---|---|---|---|
| 5,691,708 | A | * | 11/1997 | Batchelder | G06F 17/30719 340/7.29 |
| 5,937,160 | A | * | 8/1999 | Davis | G06F 16/9558 709/203 |
| 6,044,387 | A | * | 3/2000 | Angiulo | G06F 40/166 715/257 |
| 6,101,509 | A | * | 8/2000 | Hanson | H04L 67/02 715/205 |
| 6,643,721 | B1 | * | 11/2003 | Sun | G06F 3/038 710/10 |
| 7,509,400 | B1 | * | 3/2009 | Tanner | G06F 13/387 370/352 |
| 8,452,769 | B2 | * | 5/2013 | Altaf | G06F 17/30637 707/722 |

(Continued)

OTHER PUBLICATIONS

Arianto, Pungki, "Moving or Rename File / Directory in Linux—10 Practical mv Command Examples", LinOxide, Feb. 3, 2014 https://web.archive.org/web/20140209020019/https://linoxide.com/linux-command/mv-command-linux/.*

*Primary Examiner* — Cesar B Paula
*Assistant Examiner* — David Faber
(74) *Attorney, Agent, or Firm* — Hickman Becker Bingham Ledesma LLP

(57) ABSTRACT

Inline content item editor commands are provided. An implementation allows a user to initiate various functions related to a content item being edited by entering a command expression inline with the content of the content item being edited. The manner of editor function initiation saves the user time and effort and reduces cognitive burden on the user because it does not require the user to change input modes (e.g., from keyboard to mouse) or change input areas (e.g., from a content item editing area to a distant toolbar or context menu) in order to initiate the function and, if applicable, provide parameters to the function.

29 Claims, 21 Drawing Sheets

(56) References Cited

U.S. PATENT DOCUMENTS

| | | | | |
|---|---|---|---|---|
| 8,521,517 B2* | 8/2013 | O'Neill | G06F 17/3053 | 704/1 |
| 8,522,134 B1* | 8/2013 | Zetlen | G06F 16/958 | 715/235 |
| 8,688,687 B1* | 4/2014 | Hoelzle | G06F 17/30637 | 707/713 |
| 8,688,698 B1* | 4/2014 | Black | G06F 17/3064 | 707/708 |
| 8,739,121 B1* | 5/2014 | Jones | G06F 8/73 | 717/110 |
| 8,938,669 B1* | 1/2015 | Cohen | H04L 65/403 | 715/255 |
| 8,959,109 B2* | 2/2015 | Scott | G06F 17/30637 | 707/769 |
| 9,037,459 B2* | 5/2015 | Foo | G06F 3/0237 | 341/22 |
| 9,722,879 B1* | 8/2017 | Muthu | H04L 41/22 | |
| 10,063,501 B2* | 8/2018 | Lane | G06F 40/169 | |
| 10,503,818 B2* | 12/2019 | Satterfield | G06F 3/0484 | |
| 2002/0002453 A1* | 1/2002 | Lazaridis | G06F 17/2765 | 704/9 |
| 2004/0117380 A1* | 6/2004 | Perrow | G06F 3/0237 | |
| 2005/0071740 A1* | 3/2005 | Chee | G06F 9/52 | 715/272 |
| 2005/0081141 A1* | 4/2005 | Jonsson | G06F 8/34 | 717/116 |
| 2005/0243066 A1* | 11/2005 | Li | G06F 9/45512 | 345/168 |
| 2008/0065460 A1* | 3/2008 | Raynor | G06Q 10/06 | 705/7.21 |
| 2008/0155565 A1* | 6/2008 | Poduri | G06F 9/453 | 719/320 |
| 2009/0172541 A1* | 7/2009 | Acedo | G06F 9/45512 | 715/708 |
| 2011/0154338 A1* | 6/2011 | Ramanathaiah | G06Q 10/06 | 718/100 |
| 2011/0154342 A1* | 6/2011 | Logan | G06Q 10/109 | 718/101 |
| 2012/0192096 A1* | 7/2012 | Bowman | G06F 3/0481 | 715/780 |
| 2012/0296919 A1* | 11/2012 | Sinha | H04L 67/327 | 707/749 |
| 2012/0297294 A1* | 11/2012 | Scott | G06F 17/273 | 715/261 |
| 2013/0031208 A1* | 1/2013 | Linton | G09B 7/02 | 709/217 |
| 2013/0073634 A1* | 3/2013 | Saiu | G06Q 10/0631 | 709/206 |
| 2013/0179460 A1* | 7/2013 | Acuna | G06F 17/276 | 707/758 |
| 2013/0226991 A1* | 8/2013 | Isaacs | H04L 67/02 | 709/203 |
| 2013/0262574 A1* | 10/2013 | Cohen | G06F 17/2765 | 709/204 |
| 2013/0263043 A1* | 10/2013 | Sarbin | G06F 3/0488 | 715/784 |
| 2013/0297317 A1* | 11/2013 | Lee | G10L 17/005 | 704/270.1 |
| 2014/0096066 A1* | 4/2014 | Auvenshine | G06F 9/45512 | 715/780 |
| 2014/0101544 A1* | 4/2014 | Albrecht | G06F 17/278 | 715/273 |
| 2014/0108923 A1* | 4/2014 | Bhatt | G06F 17/2276 | 715/271 |
| 2014/0173426 A1* | 6/2014 | Huang | G06F 17/24 | 715/256 |
| 2014/0243028 A1* | 8/2014 | Colombo | H04W 4/12 | 455/466 |
| 2014/0280297 A1* | 9/2014 | Gulli | G06F 17/30389 | 707/769 |
| 2015/0127603 A1* | 5/2015 | Cohen | G06F 17/24 | 707/608 |
| 2015/0266298 A1* | 9/2015 | Kifuku | B41J 2/16508 | 347/9 |
| 2015/0324339 A1* | 11/2015 | Gubin | G06F 17/30477 | 707/722 |
| 2016/0269337 A1* | 9/2016 | Blinder | H04L 51/22 | |
| 2016/0335246 A1* | 11/2016 | Wright | G06F 17/30368 | |
| 2016/0342571 A1* | 11/2016 | Lane | G06Q 10/103 | |
| 2016/0342665 A1* | 11/2016 | Lane | G06F 3/0484 | |
| 2016/0344667 A1* | 11/2016 | Lane | H04L 51/08 | |
| 2017/0206190 A1* | 7/2017 | Satterfield | G06F 3/0482 | |
| 2017/0237787 A1* | 8/2017 | Schulz | H04L 51/34 | 715/202 |
| 2017/0263248 A1* | 9/2017 | Gruber | G10L 15/22 | |

* cited by examiner

```
                                    500
┌─────────────────────────────────────────────────────────────────┐
│     Display an editing area of a collaborative content item. 502│
└─────────────────────────────────────────────────────────────────┘
                                    ▼
┌─────────────────────────────────────────────────────────────────┐
│ Receive a first input and display a first text sequence corresponding to the first input. 504 │
└─────────────────────────────────────────────────────────────────┘
                                    ▼
┌─────────────────────────────────────────────────────────────────┐
│  Determine that the first text sequence matches a predetermined character sequence. 506 │
└─────────────────────────────────────────────────────────────────┘
                                    ▼
┌─────────────────────────────────────────────────────────────────┐
│ Receive a second input and display a second text sequence corresponding to the second input. │
│                                  508                             │
└─────────────────────────────────────────────────────────────────┘
                                    ▼
┌─────────────────────────────────────────────────────────────────┐
│ Based, at least in part, on the determining that the first text sequence matches the │
│ predetermined text character sequence, interpreting the second text sequence as a command. │
│                                  510                             │
└─────────────────────────────────────────────────────────────────┘
                                    ▼
                           ◇ Command accepts ◇
                           ◇ parameter(s)? 512 ◇
               Yes  ◀───────                 ───────▶ No
                    ▼                                 ▼
                   TO                                TO
                 FIG. 5B                           FIG. 5C
```

*FIG. 5A*

INLINE CONTENT ITEM EDITOR COMMANDS

CROSS-REFERENCE TO RELATED APPLICATION

This application claims the benefit of Provisional Appln. 62/441,006, filed Dec. 30, 2016, the entire contents of which is hereby incorporated by reference as if fully set forth herein, under 35 U.S.C. § 119(e).

TECHNICAL FIELD

The present disclosure relates to computer content item editors and, more particularly, to inline content item editor commands.

BACKGROUND

Users of content item editors (e.g., word processing applications) can spend significant amount of time selecting tools to perform various functions. These functions can include both editing content within the content item and performing related features such as naming the content item, printing, looking up related data, etc. This process often requires changing input modes (e.g., from keyboard to mouse) and input areas (e.g., from the content of the content item to a tool bar or context menu).

These context changes can cost the user time and may cause the user to lose the context of the operation, particularly where the tool or operation requires parameters that are selected in a separate window or modal (e.g., inserting a link can bring up a separate window to enter the link location and link text).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

For a better understanding of embodiments of the present technology, reference should be made to the descriptions of the embodiments below, in conjunction with the following drawings in which like reference numerals refer to corresponding parts throughout the figures.

FIG. 5A, FIG. 5B, and FIG. 5C show a flowchart of a process for implementing an inline content item editor command, according to some embodiments.

DETAILED DESCRIPTION

Figure 1A:
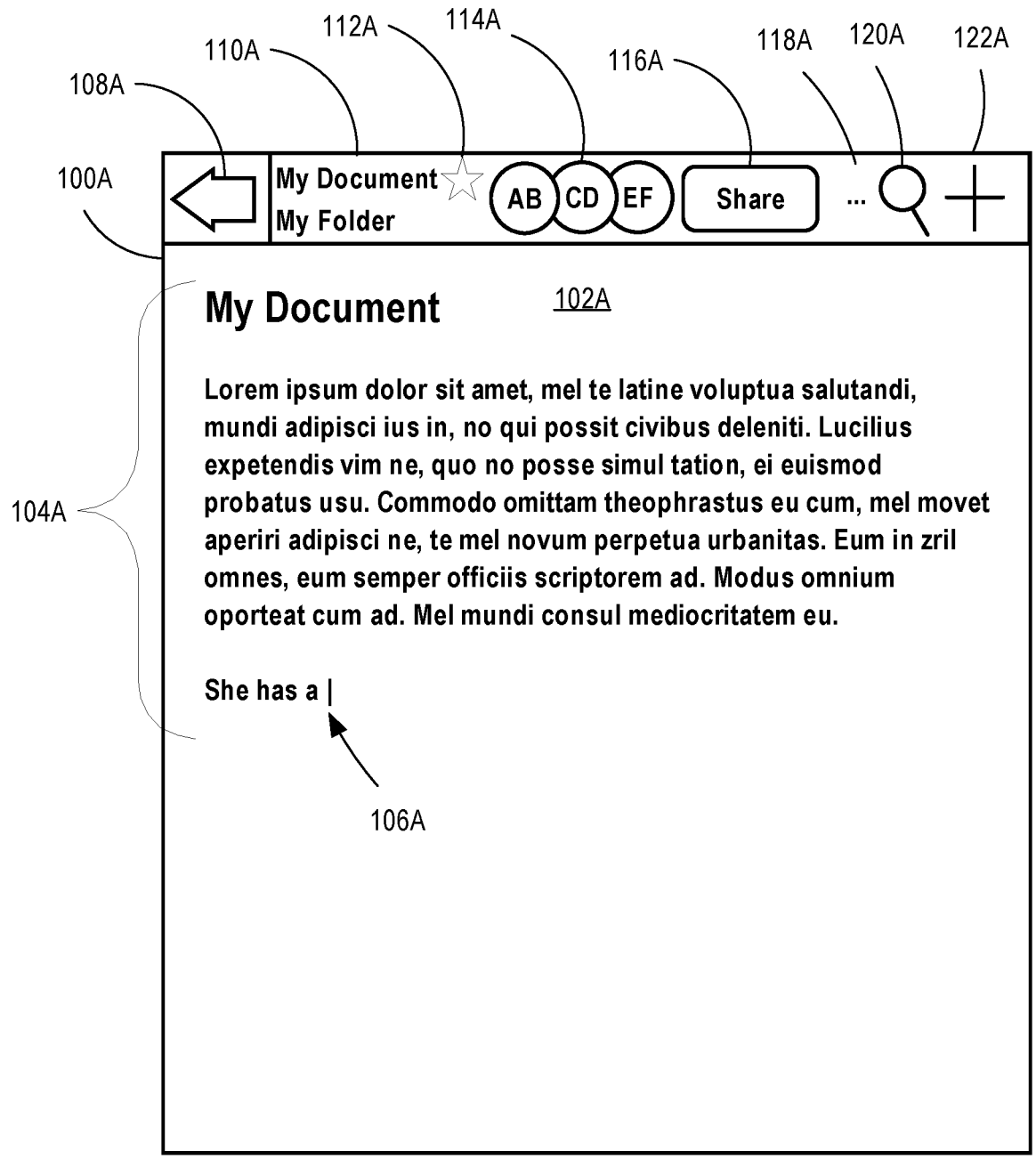
FIGS. 1A-1G illustrate exemplary user interfaces for inline content item editor commands, according to some embodiments.

In the following description, for the purposes of explanation, numerous specific details are set forth in order to provide a thorough understanding of the present technology. It will be apparent, however, that the present technology may be implemented without these specific details. In other instances, well-known structures and devices are shown in block diagram form in order to avoid unnecessarily obscuring the present technology.

Inline Content Item Editor Commands

Some embodiments of the present technology allow a user to initiate (e.g., have automatically invoked) various content item editor functions by entering a command expression inline with the content of a content item being edited. The command expression may start with a particular sequence of one or more characters (e.g., a forward slash character '/'), followed by an identifier of the editor function to initiate. In some cases, the command expression can also, depending on the editor function to be initiated, include one or more user-specified parameters to the editor function initiation.

After the inline command expression is entered, the editor function of the content item editor may be automatically initiated, according to any parameters provided, if applicable. Thus, the user can initiate different editor functions of the content item editor by entering an appropriate command expression inline while the user is editing the content item. This manner of editor function initiation saves the user time and effort because it does not require the user to change input modes (e.g., from keyboard to mouse) or change input areas (e.g., from the content item editing area to a toolbar or context menu) in order to initiate the editor function and, if applicable, provide parameters to the editor function. This manner of editor function initiation may also be easier for the user to remember how to perform compared to, for example, a hot key sequence because the editor function can be initiated by the name of a command corresponding to the function as opposed to having to remember a relatively arbitrary hot key sequence. For example, it may be easier for the user to remember that the synonyms editor function can be invoked by "/synonym" inline content item editor command expression as opposed to having to remember a hot key sequence such as, for example, Ctrl+Shift+S.

To illustrate how the user can benefit from inline content item editor commands, an example is useful. A possible synonyms editor function may provide a list of selectable synonyms of a given word. In the content item editing area of the content item editor, the user may consecutively enter the sequence of characters: "She had a /synonym sunny".

Here, the character sequence "She had a " is part of the content of the content item and the character sequence "/synonym sunny" is an inline command expression for invoking the synonyms editor function with the parameter "sunny". In response to the user entering the inline command expression in the content item editing area, the content item editor may automatically provide a pop-up list of selectable items providing synonyms of the word "sunny" such as, for example, "cheerful", "cheery", "bubbly", etc. Upon selecting one of the list items (e.g. "bubbly"), the inline command expression in the content item editing area may be automatically replaced with the selected synonym. For example, upon the user selecting the list item corresponding to the synonym "bubbly", (e.g., by using keyboard arrow keys to navigate the pop-up items and the enter key to select a synonym) the entered inline command expression "/synonym sunny" may be automatically replaced in the content item editing area with the character sequence "bubbly". The user may then continue editing the content item from that point. For example, the user may then enter the character sequence "disposition." to complete the sentence. Notably, the user was able to initiate and provide a parameter to the synonym editor function by entering the command expression inline with the content of the content item without having to change input modes or input areas, thereby saving the user time and effort editing the content item.

While in some embodiments the inline command expression is replaced with a textual representation of output of the content item editor function, the inline command expression is replaced with a media representation of the output of the content item editor function. The media representation can be a digital image (e.g., graphic, icon, thumbnail preview, etc.), digital video, or digital audio, for example.

While an editor function initiated by entering an inline command expression can result in a change to the content of the content item being edited, an initiated editor function is not required to change the content. For example, an initiated editor function can perform an action on the content item without changing its contents. For example, printing the content item (e.g., with a "/print" inline command expression) or moving the storage location of the content item (e.g., with a "/move" inline command expression) are two examples of possible editor commands that can be initiated with an inline command expression that may take an action in relation to the content item without changing the contents of the content item.

In some embodiments, a user customized editor function that is initiated by an inline command expression is possible. Specifically, the content item editor provides an application programming interface (API) by which a user can implement the custom editor function and have it initiated by an inline command expression. For example, by virtue of the API, the user can implement a custom editor command which, when initiated by an entered inline command expression, may contact an online service, obtain content from the online service (e.g., text or an image), and embed the obtained content inline in the content item being edited.

In this description, for purposes of providing clear examples, reference is made to invoking an "editor function" based on an inline command expression entered by a user. In this context, the term "editor function" is intended to broadly encompass any client-side and/or server-side functionality of a content item editor that can be initiated by an inline command expression including any tools, features, plug-ins, mechanisms, or other functionality of a content item editor that can be initiated by an inline command expression.

Also in this description, reference is made to a "sequence" of characters such a sequence of characters entered as part of an inline content item editor command expression. While such a sequence may include more than one character, such a sequence may encompass just a single character. Thus, the term "sequence" in this context is not limited to a sequence of multiple characters and may encompass a sequence of a one character.

Figure 10:
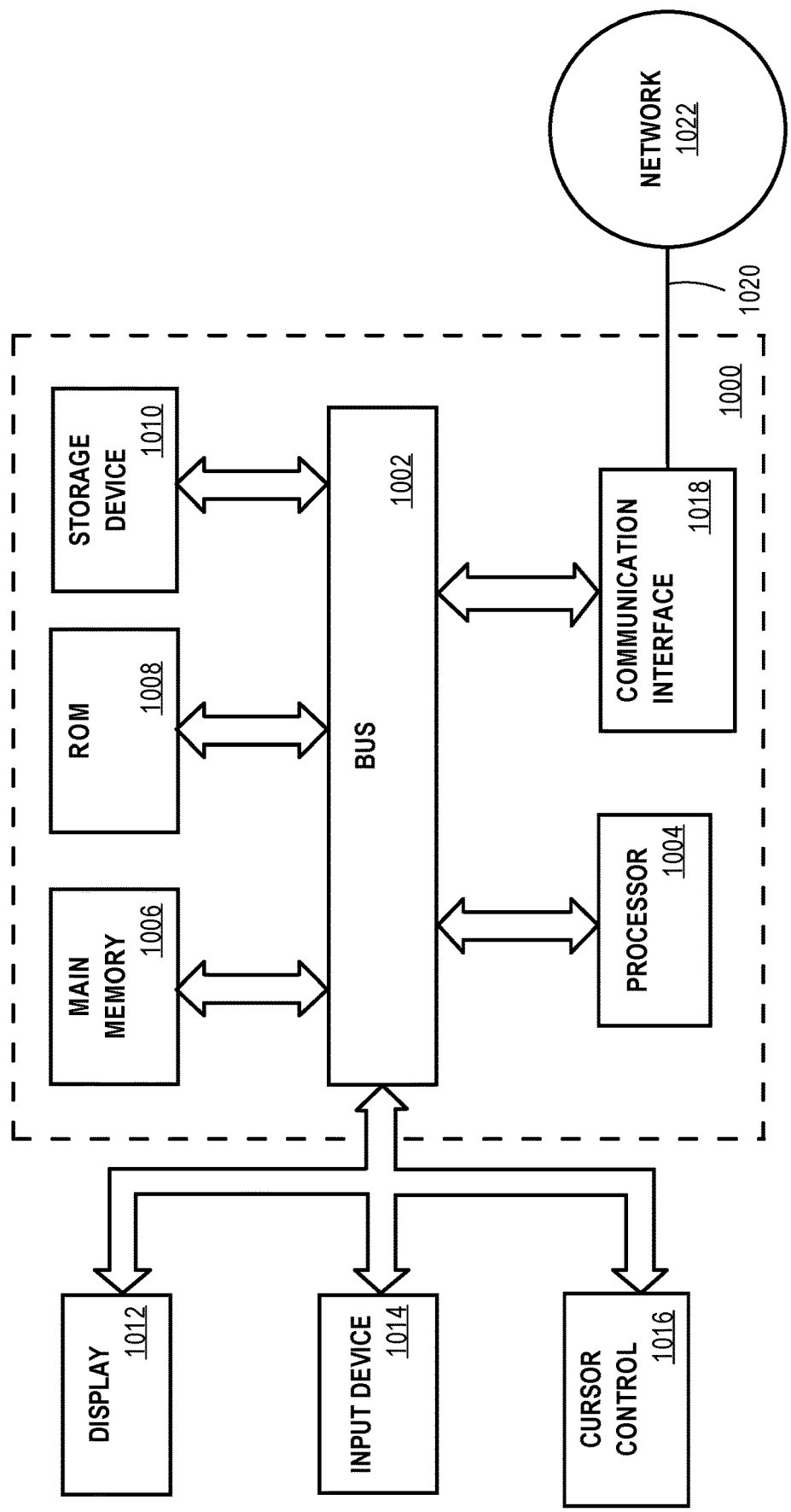
FIG. 10 is a schematic representation of a basic hardware machine with which some embodiments may be implemented.
Figure 11:
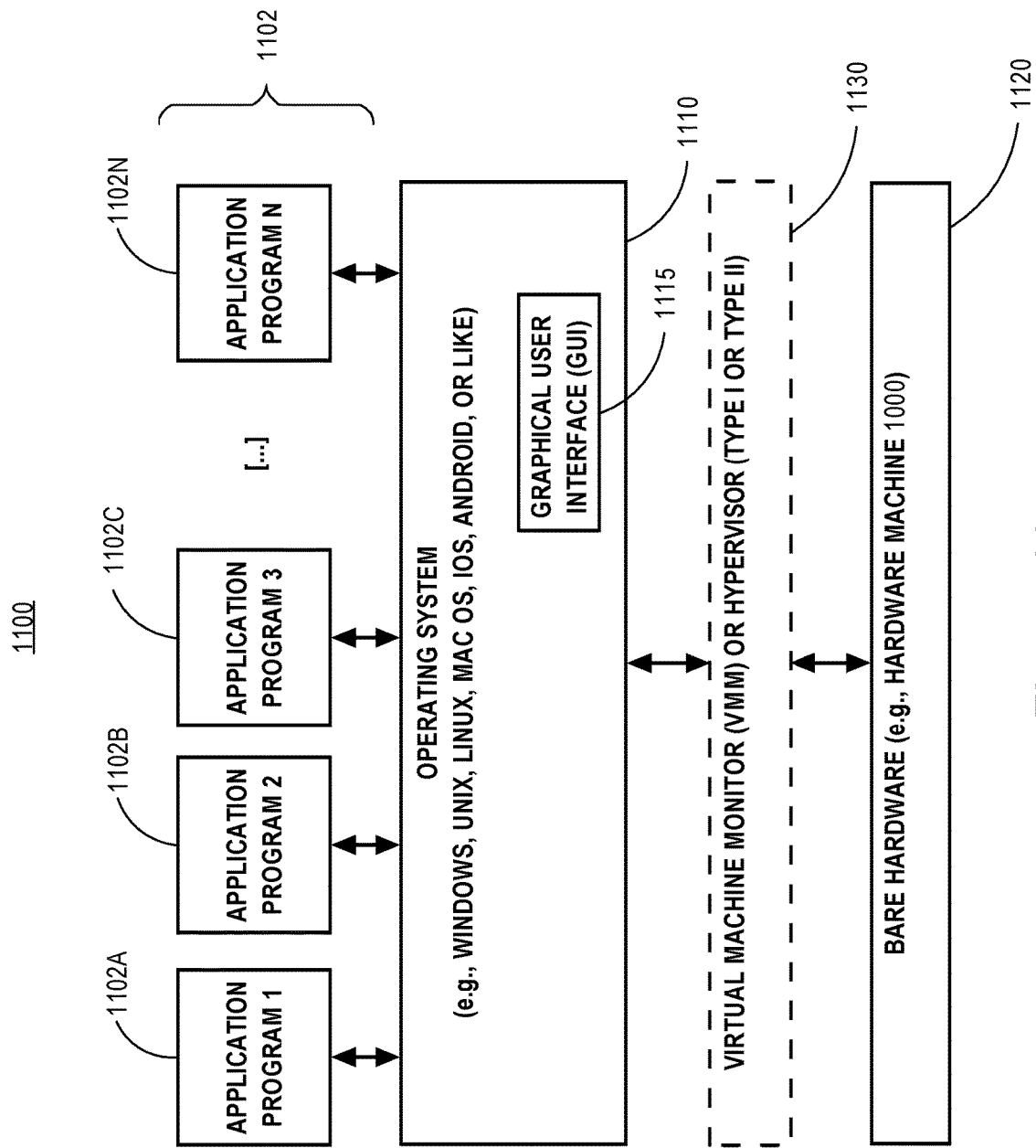
FIG. 11 is a schematic representation of a basic software system for controlling the operation of the basic hardware machine.

Attention is now directed towards exemplary user interfaces ("UI") and associated process that may be implemented on a computing device with a display, such as hardware machine 1000 of FIG. 10 configured with software system 1100 of FIG. 11.

Exemplary User Interfaces

FIGS. 1A-1G illustrate exemplary user interfaces and associated processes for using inline content item editor commands in accordance with some embodiments.

UI 100A (FIG. 1A) depicts an exemplary text input user interface for a content item editing application on a display of a computing device. However, inline content item editor commands can be used by any application and/or computing device operating system supporting text character input from selections on a physical or soft keyboard or other text character input mechanism, and the use of inline content item editor commands is not limited to content item editing applications and/or device operating system supporting content item editing applications.

UI 100A includes a content item editing area 102A for editing content 104A of a content item. Although the content 104A being edited in the example of FIG. 1A is text content (e.g., one or more sequences of text characters), content item editing area 102A is not limited for use in editing only text content. Editing area 102A may be used for editing other types of content in addition to text content such as image content, graphics content, video content, and/or audio content. Further, editing content 104A is not limited to adding content to, removing content from, or changing the content of content 104A. Editing may also include configuring the layout, orientation, and format of content 104A, for example.

UI 100A also provides a toolbar at the top of the UI 100A. The toolbar includes an interactive back button 108A for returning to a prior user interface state. The toolbar also includes title and folder information 110A pertaining to the content item being edited. In this example, the title of the content item is "My Document" and the content item is contained in a folder named "My Folder". The toolbar also includes an interactive "favorites" icon 112A which, if selected, tags, marks, or otherwise designates the content item as one of the editing user's favorites. The icon 112A may be displayed differently (e.g., in a different color) depending on whether the content item is currently designated as one of the editing user's favorites. The toolbar also includes following avatars 114A which indicate users that have accessed the content item, including the current user editing the content item. In this example, an avatar of a user includes the user's initials. However, the avatar could represent a user otherwise (e.g., with a thumbnail photo or the user or other icon representing the user). The toolbar also includes an interactive share button 116A that allows the editing user to share the content item with one or more other users that the editing user selects. The toolbar also includes an interactive "options" button 118A that, if activated, provides a drop-down menu of various editor functions that the editing user can select from the drop-down menu. Such selectable editor functions may include displaying a view history, displaying a current word count, printing the content item, downloading the content item, moving the content item to a different folder, archiving the content item, etc. The toolbar also includes an interactive search icon 120A that allows the editing user to search within the content item and/or search for other content items that the editing user has access to. The toolbar also includes an interactive new document icon 122A for creating a new content item. The toolbar provided in UI 100A is merely exemplary and UI 100A may provide a toolbar displaying different information and/or providing a different set of options to the editing user. All of the functions available in the toolbar provided in UI 100A are examples of content item edit functions that can be invoked using an inline content item editor command.

A user may interact with UI 100A of the content item editing application to author (create) the content item. The content item may belong to a general content type category such as, for example, text (e.g., a textual message, plain unformatted text, enriched text, word processing text, rich text, etc.), multipart (e.g., data consisting of multiple parts of independent data types including text and other media such as images, video, sound, etc.), message (e.g., an encapsulated message, an RFC 822 conformant message, etc.), or application (e.g., some other kind of data, binary data in a standardized, proprietary, or application-specific format, etc.).

Within a general content type category, the content item may have a specific content type. In some embodiments, the content item comprises an "attributed" text string representing the content 104A and an associated set of attributes. Each attribute may be associated with a character or a range of one or more characters in the attributed text string to which the attribute applies or describes. The association between an attribute and a character or a range of one or more characters may be established by a numerical index or numerical indices into the attributed text string that identify the character or range of characters with which the attribute is associated. An attribute may be a key/value pair, identified by the key, where no two attributes that apply to a given character of the attributed text string have the same key. Attributes associated with the attributed text string may be processed in an application-specific manner. For example, the range of characters in the attributed text string representing the text characters "My Document" of content 104A may be associated with an attribute that indicates that the characters are to be formatted by the content item editing application in an 18-point typeface.

When stored in a computer (e.g., on disk or in memory), the content item may be stored in a variety of different manners. In one way, the content item may be stored as a sequence of change sets. In this context, a change set represents an edit to a particular version of the content item. When applied to a version of the content item, a change set can insert and delete characters and apply attributes to ranges of characters. For example, a particular change set might represent the edit insert the lowercase character "d" at position 2 in the text string. If the particular change set is applied to a version of the content item having the text string "abc\n", then the resulting content item version would have the text string "adbc\n". The content item comprising the attributed text string and the set of associated attributes may thus be formed by applying a sequence of change sets to an initial version of the content item. The initial content item version may be a content item template or a prior version of the content item, for example.

The content item may be stored in various different types of data containers. For example, the content item may be stored in a file system file container, in a database, in one or more data blocks in a distributed file system, or as a base version and a series of any number of changes to the base version. The content item may be stored by a single computing device or portions of the content item may be stored by different computing devices in a distributed file system.

The content item may be configured for unidirectional or bidirectional synchronization. In the unidirectional case, changes to the content item originating at a user's computing device are replicated to one or more other computing devices where the replicated changes are applied to copies of the content item stored at those other computing devices. In the case of bidirectional synchronization, changes to the content item originating at a user's computing device are replicated to one or more other computing devices where the replicated changes are applied to copies of the content item stored at those other computing device as in the case of unidirectional synchronization. In addition, with bidirectional synchronization, changes to the content item originating at the other computing devices are replicated to the user's computing device where the replicated changes are applied to a copy of the content item stored at the user's computing device.

When content item changes are replicated between computing devices, the changes may be replicated through an intermediary server system operated by an online service provider that stores and forwards the changes. However, it is also possible to replicate content item changes between computing devices in a peer-to-peer fashion. In a peer-to-peer scenario, the intermediary server system may still provide metadata to computing devices for facilitating peer-to-peer replication of content item changes even though the content item changes themselves are not stored and forwarded by the intermediary server system. Further, because changes can be (asynchronously) replicated, there may be a period of time where copies of the content item at different computing devices are not identical.

Commands That Change Content Item Content

With the above discussion in mind, attention is directed again to UI 100A of FIG. 1. Editing area 102A includes a text input cursor 106A at a current location in the editing area 102A. The editing user may start an inline content item editor command expression by entering a predetermined character sequence. The user may enter a character of the predetermined character sequence by striking or selecting the corresponding key on a physical or virtual keyboard or speaking the character sequence, for example, or otherwise indicating the character sequence using an appropriate user input mechanism.

In some embodiments, the predetermined character sequence consists of a single forward slash character (e.g. '/'). However, the predetermined character sequence could consist of multiple characters. For example, the predetermined character sequence could consist of two consecutive forward slash characters (e.g. '//'). Further, the predetermined character sequence may involve a non-printable character. For example, the predetermined character sequence could consist of the user holding down the control key (Ctrl) while entering the forward slash character (Ctrl+'/'). Further, depending on current editing context, the user entering the predetermined character sequence may not be treated by the content item editing application as the start of an inline content item editor command expression such as, for example, when the user is editing a mathematical equation or in another editing context where the predetermined character sequence has a preferred different interpretation.

For the sake of providing clear examples, the examples provided herein assume that the predetermined character sequence is a single forward slash character ('/'). However, as just described, the predetermined character sequence used to indicate the start of an inline content item editor command expression can be otherwise.

In some embodiments, upon the user entering the predetermined character sequence, the user may be prompted with a pop-up menu that provides a list of selectable available inline content item editor commands from which the user can select. The commands may be listed in alphabetical order, for example, or other order, such as mostly recently used commands listed first, or the most relevant commands for the current editing context listed first.

In some embodiments, if the user enters a backspace key (Backspace) or delete key (Delete), then the pop-up menu is removed from the display and the predetermined character sequence is treated literally (e.g., as part of the content of the content item being edited) and not as the start of an inline content item editor command expression.

In some embodiments, if, after entering the character sequence indicating the start of an inline content item editor command, the user enters another character sequence that does not match a command of the content item editor established to be used as an inline command, the predetermined character sequence is treated literally and not as the start of an inline content item editor command expression.

In some embodiments, the pop-up menu is displayed just below or above the line or the area of the editing area 102A where the user entered the predetermined character sequence so as not to visibly obstruct or not completely obstruct the inline content item editor command expression. For example, the top border of the pop-menu may be displayed in the next line below the current editing line, or the area where the next line would be displayed below the current editing line, or if the current editing line is near the bottom of the currently viewable portion of the editing area 102, the bottom border of the pop-up menu many be displayed in the line above the current editing line. In any case, the pop-up menu can be configured to not visually obstruct (or not completely obstruct) the inline content item editor command expression so that the user can at least partially view the expression while entering it.

The pop-up menu allows the user to see what inline content item editor commands are available. Each item in the menu may correspond to a command and may provide the name or identifier of the command. Each item may provide additional information about the command such as what parameters it accepts, if any, and whether each parameter accepted is optional or required. The pop-up menu may also be interactive. For example, the user may change input modes (e.g., from keyboard to mouse) to select a command from the menu, or to get more information about the command. However, because the pop-up menu may not completely obstruct the inline content item editor command expression, the user may not change input modes or input areas to select a command. Yet, at the same time, the pop-up menu may provide useful information about a command such as the parameters accepted as the user is entering (typing) the command as part of the inline content item editor command expression.

In some embodiments, after the user enters the predetermined character sequence indicating the start of an inline content item editor command expression, as the user enters characters of the inline command to be initiated, the selectable items displayed in the pop-up menu change to include only those that match or prefix match the inline command characters entered. For example, if the user enters the character sequence "/s", then the pop-up menu may display only inline content item editor commands that start with the letter 's'.

In some embodiments, the content item editing application may auto-complete the command in the inline command expression for the user, e.g., with characters in a top-matching command.

In some embodiments, if the characters entered by the user for the command unambiguously refers to one command, then the content item editing application may auto-complete the command in the inline command expression for the user with the unambiguous command. For example, if the "synonym" command is the only available command that starts with "sy", then after the user enters the character sequence "/sy", the content item editing application may automatically complete the character sequence to display "/synonym". As an alternative, the only available command that matches the entered characters may be offered as an option (e.g., by highlighting the full command in the command pop-up menu) which the user can accept by selecting a predetermined key such as, for example, the tab (Tab) or enter (Enter) key. Upon selecting the predetermined key when the option is offered, the character sequence may be automatically completed with the full command. Alternatively, the user can ignore the offered option and continue selecting other characters (e.g., if the user intended to enter a literal sequence of character and not an inline content item editor command expression).

Figure 1B:
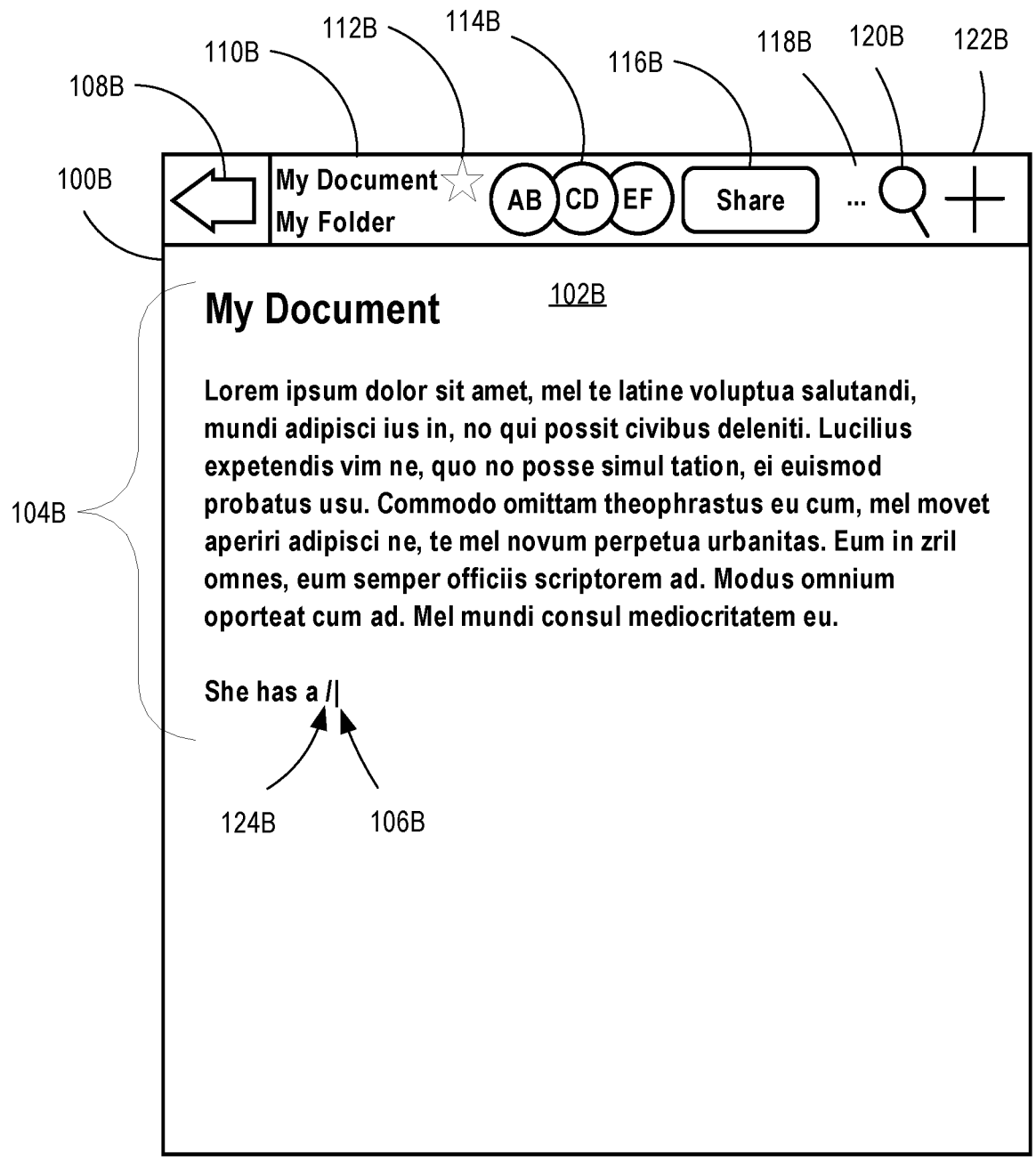

Turning now to FIG. 1B, it shows UI 100B after the user has entered the predetermined character sequence 124B consisting of a single forward slash character ('/') following whitespace into the editing area 102A of UI 100A (FIG. 1A). Accordingly, the current location of the text input cursor 106B has moved from its location in UI 100A to a location in UI 100B following the predetermined character sequence 124B. User interface elements 104B, 108B, 110B, 112B, 114B, 116B, 118B, 120B, and 122B may be like user interface elements 104A, 108A, 110A, 112A, 114A, 116A, 118A, 120A, and 122A of UI 100A (FIG. 1A), respectively.

Figure 1C:
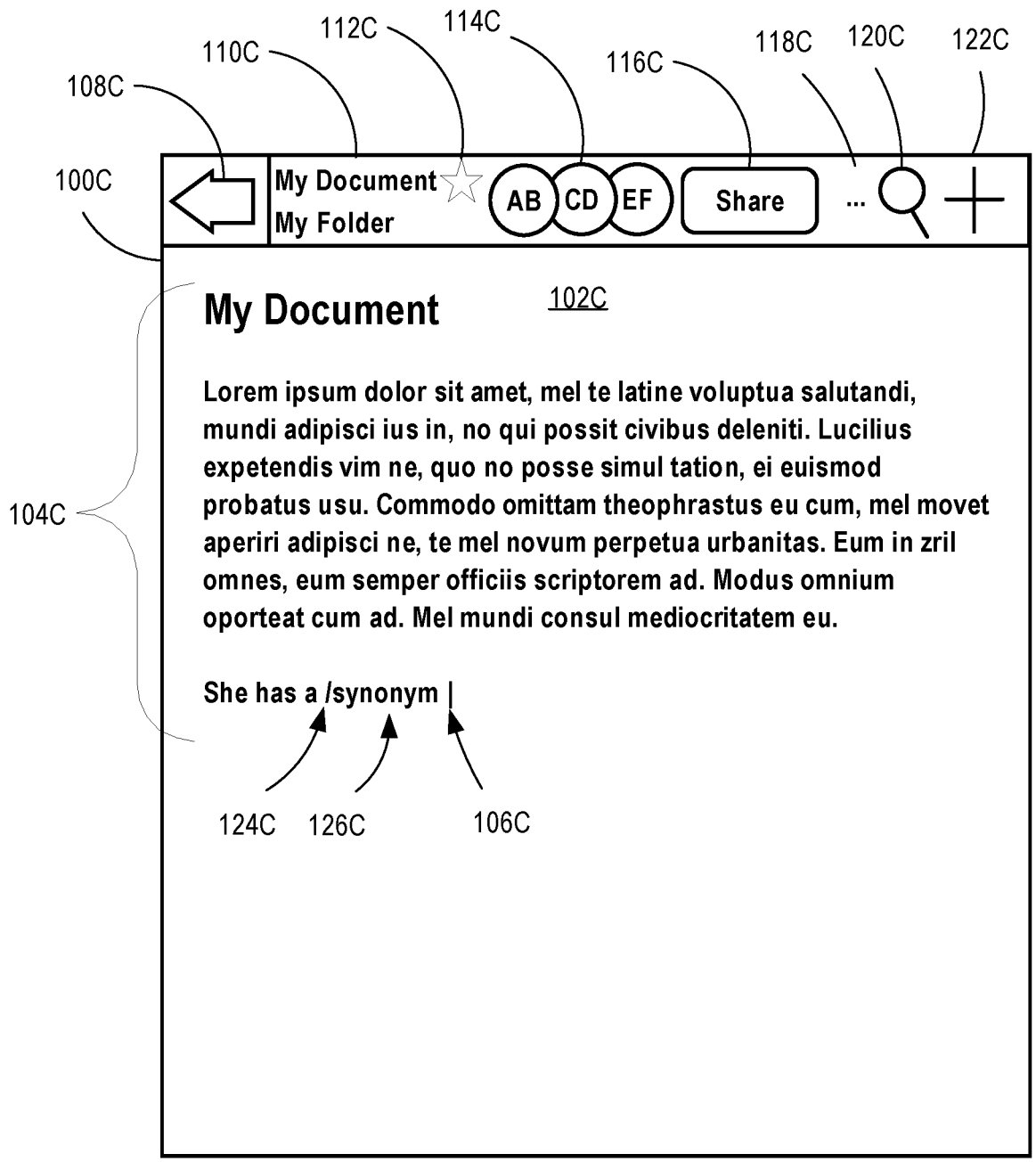

Turning now to FIG. 1C, it shows UI 100C after the user has entered or selected a character sequence 126C representing a selected inline content item editor command into editing area 102B of UI 100B (FIG. 1B), in this example the synonym command. Accordingly, the current location of the text input cursor 106C has moved from its location in UI 100B to a location in UI 100B following the command character sequence 126C. Note that the command character sequence 126C may or may not include the following whitespace character. That is, the content item editing application may consider that a command has been selected either after the user enters a sequence of characters that unambiguously refers to one available command, or not until after the user enters a whitespace character after the user enters a sequence of characters that unambiguously refers to one available command. User interface elements 104C, 108C, 110C, 112C, 114C, 116C, 118C, 120C, and 122C may be like user interface elements 104A, 108A, 110A, 112A, 114A, 116A, 118A, 120A, and 122A of UI 100A (FIG. 1A), respectively. User interface element 124C may be like element 124B of UI 100B (FIG. 1B).

Figure 1D:
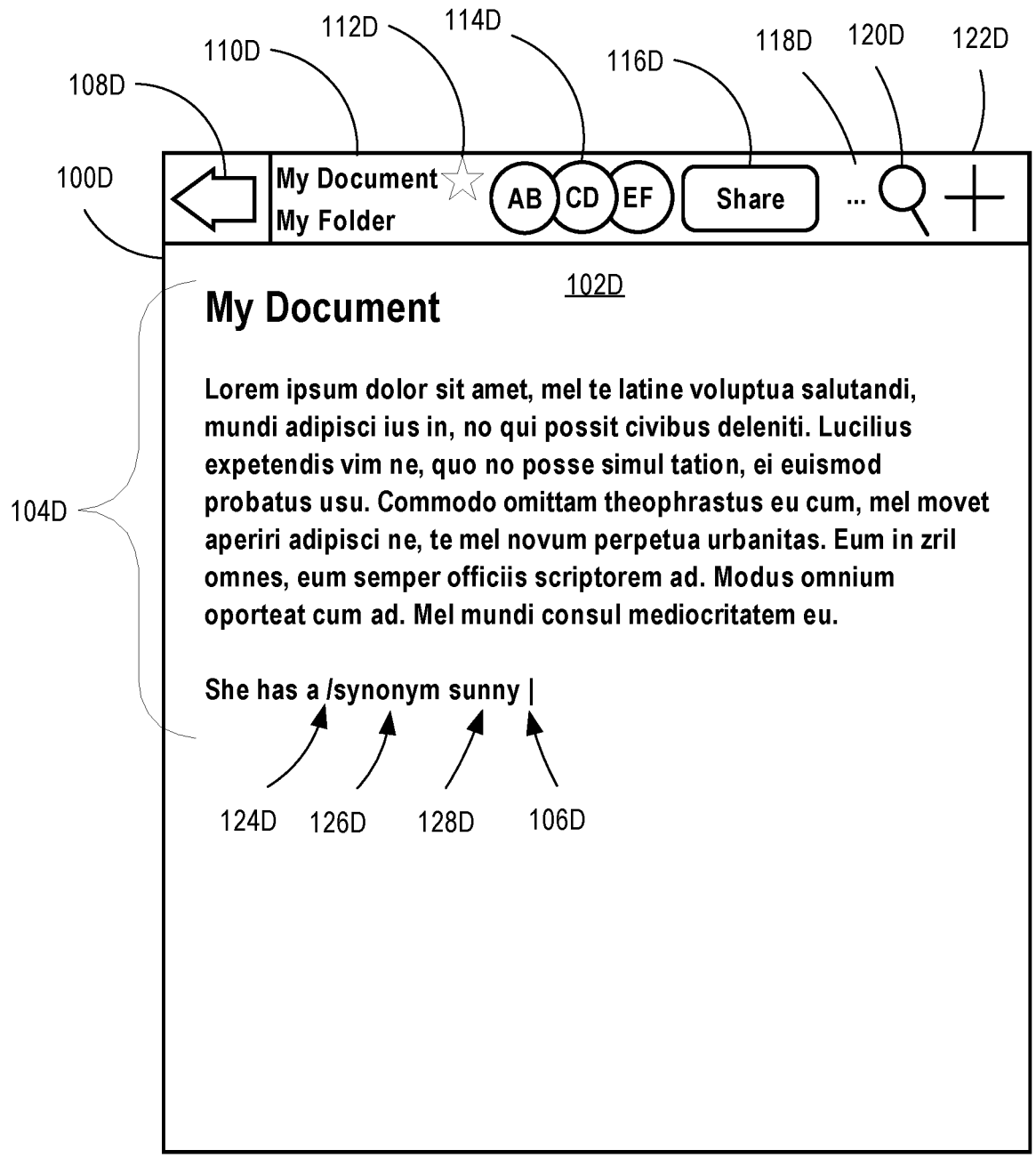

Turning now to FIG. 1D, it shows UI 100D with editing area 102D after the user has entered or selected a character sequence 128D representing a parameter of the selected command into editing area 102C of UI 100C (FIG. 1C). Accordingly, the current location of the text input cursor 106D has moved its location in UI 100C to a location in UI 100D following the parameter character sequence 128D.

Note that the parameter character sequence 128D may or may not include the following whitespace character. That is, the content item editing application may consider that a parameter has been selected either after the user enters a sequence of characters that unambiguously refers to a parameter, or not until after the user enters a whitespace character or other sequence of one or more characters, after the user enters a sequence of characters that unambiguously refers to a parameter. For example, the other sequence of characters could be a predefined sequence of one or more characters used to indicate the end of an inline content item editor command expression such as, for example, a single period character ('.') or the character sequence "END", or similar. User interface elements 104D, 108D, 110D, 112D, 114D, 116D, 118D, 120D, and 122D may be like user interface elements 104A, 108A, 110A, 112A, 114A, 116A, 118A, 120A, and 122A of UI 100A (FIG. 1A), respectively. User interface element 124D may be like element 124B of UI 100B (FIG. 1B). User interface element 126D may be like element 126C of UI 100C (FIG. 1C).

Upon determining that the user has entered a complete inline content item editor command expression comprising the predetermined sequence of characters, a selected inline content item editor command, and any parameters, the content item editing application may initiate automatically the corresponding editor function passing any given parameters to the function initiation.

Figure 1E:
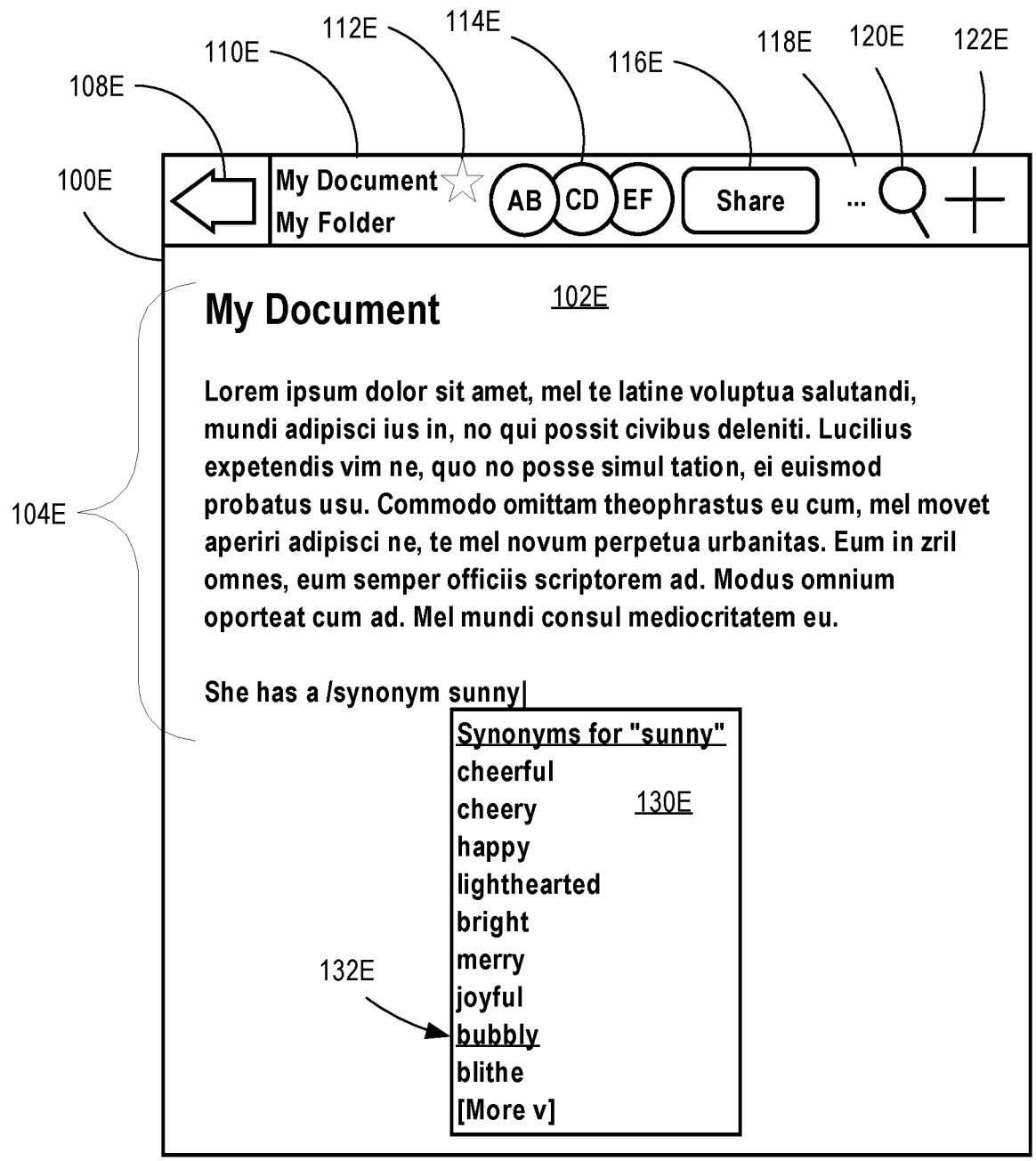

Turning now to FIG. 1E, it shows UI 100E with editing area 102E after the synonym editor function has been automatically initiated passing or otherwise providing the parameter "sunny". In this example, the synonym editor function presents pop-up dialog 130E comprising a list of selectable items where a selectable item may correspond to a synonym of "sunny". Unlike a pop-up menu that is displayed before the editor function is initiated (e.g., a pop-up menu listing available inline content item editor commands), pop-up menu 130E may or may not visibly obstruct some or all of the inline content item editor command expression. User interface elements 104E, 108E, 110E, 112E, 114E, 116E, 118E, 120E, and 122E may be like user interface elements 104A, 108A, 110A, 112A, 114A, 116A, 118A, 120A, and 122A of UI 100A (FIG. 1A), respectively.

However, a pop-up menu that is displayed as a result of automatically invoking the editor function after entering an inline content item editor command expression can be displayed inline with the expression so as not to require the user to move focus away from the current editing location in the editing area in order to interact with the pop-up menu. In this context, a pop-up menu or other dialog displayed by an editor function may be considered "inline" with the inline content item command expression if the display position of the menu or dialog in the user interface is relative to or dependent on the display position in the user interface of the inline content item command expression, or a portion thereof, or the current editing position (e.g., the current position of the text input cursor).

For example, pop-up menu 130E is displayed in UI 100E just below the inline content item editor command expression such that the user can select a synonym without losing context of the current editing position which could happen if the user was required to interact with the toolbar at the top of the UI 100E in order to select the synonym.

As illustrated by the example user interfaces of FIGS. 1A-1E, the user is able to cause automatic initiation of an editor function without having to change input modes or input areas. In particular, by entering the sequence of characters "/synonym sunny" inline with content of the content item from a current text cursor position in the editing area (e.g., the location of text cursor 106A in UI 100A), the user is able to cause the content item editing application to automatically initiate the synonyms editor function passing the parameter "sunny" as a parameter to the function and thereby causing pop-up menu 130E to be displayed to the user for selecting a synonym as a substitute for "sunny".

Figure 1F:
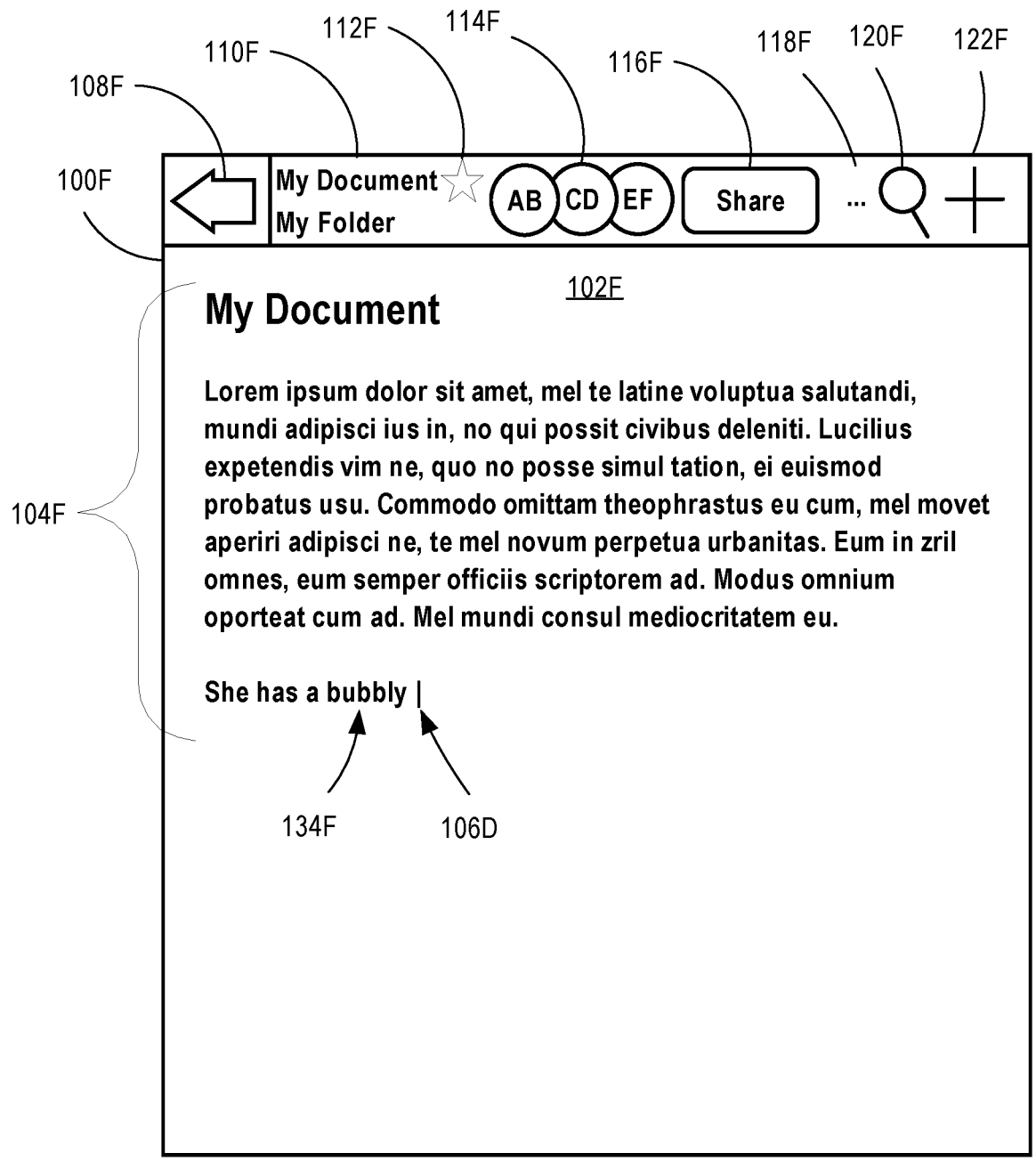

Turning now to FIG. 1F, it shows UI 100F with editing area 102F after the user has selected the "bubbly" item 132E from the synonym pop-up menu 130E in UI 100E (FIG. 1E). As a result, the inline content item editor command expression is automatically replaced by the content item editing application with a replacement sequence of characters 134F. In particular, the replacement starts at the location of the text input cursor 106A in the editing area of UI 100A where the user started entering the inline content item command expression. In addition, the current location of the text input cursor 106F has moved from its location in UI 100E to a location in UI 100F following the replacement sequence of characters 134F. User interface elements 104F, 108F, 110F, 112F, 114F, 116F, 118F, 120F, and 122F may be like user interface elements 104A, 108A, 110A, 112A, 114A, 116A, 118A, 120A, and 122A of UI 100A (FIG. 1A), respectively.

Figure 1G:
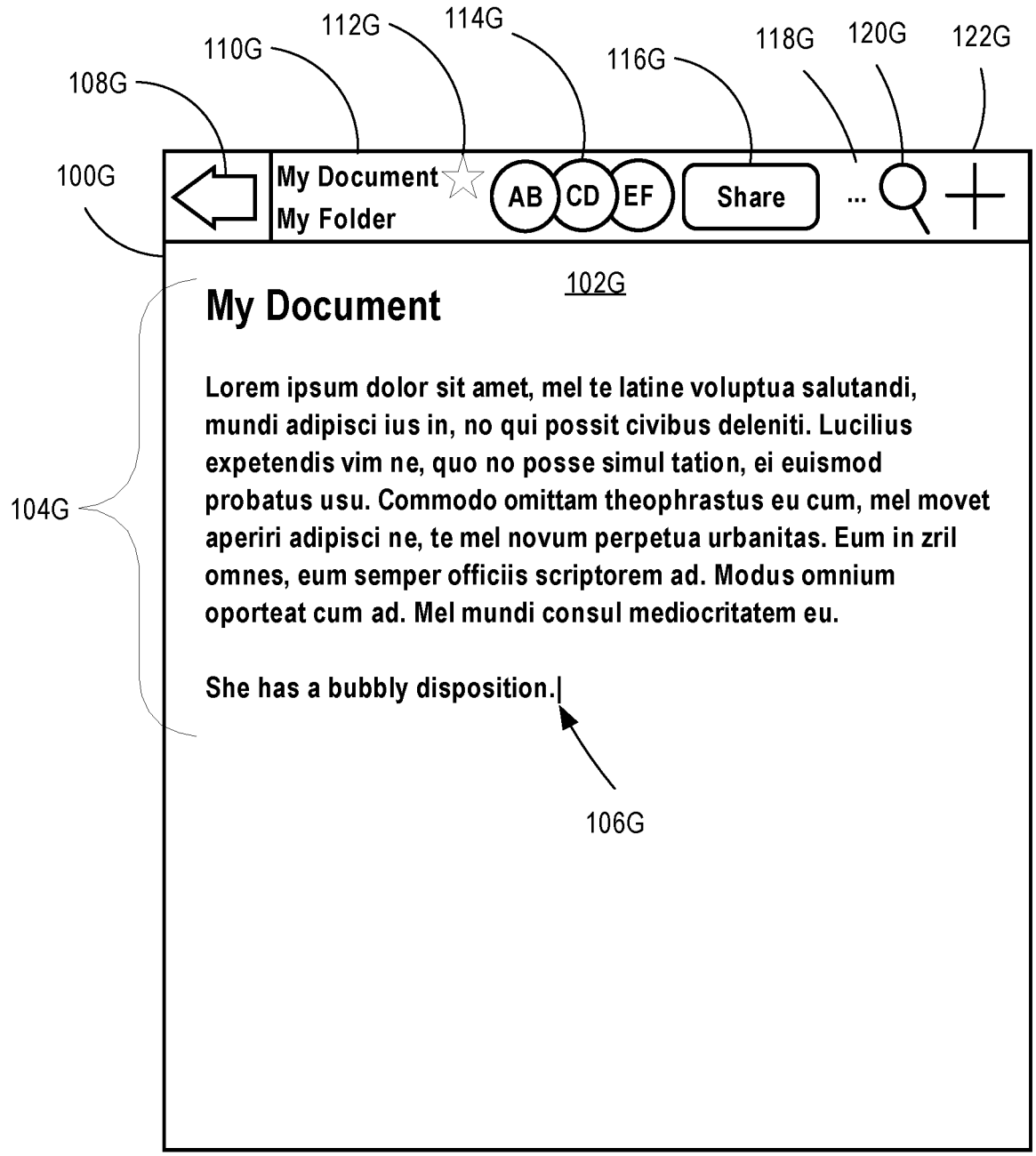

Turning now to FIG. 1G, it shows UI 100G with editing area 102G after the user has completed the sentence partially formed in UI 100F (FIG. 1F) by entering the characters of the remaining portion of the sentence. Accordingly, the current location of the text input cursor 106G has moved its location in UI 100F to a location in UI 100G following the completed sentence. User interface elements 104G, 108G, 110G, 112G, 114G, 116G, 118G, 120G, and 122G may be like user interface elements 104A, 108A, 110A, 112A, 114A, 116A, 118A, 120A, and 122A of UI 100A (FIG. 1A), respectively.

The example user interfaces 100A-G of FIGS. 1A-1G illustrate how the user can author content including initiating an editor function without having to change input modes or change input areas except perhaps to select an operation presented in a pop-up dialog presented by the editor function. If the option is selectable with the same input mode used to input the inline content item editor command expression, then the user may not need to change input modes or change input areas at all to author the content. For example, if a synonym in the pop-up menu 130E of UI 100E (FIG. 1E) is selectable by a keystroke or a sequence of keystrokes, then the user may be able to author the sentence "She has a bubbly disposition" without having to change input mode or input areas at all. For example, the user may enter the following sequence of characters using a keyboard to author the sentence: "She has a"+whitespace+"/sy"+Tab character {to auto-complete the command to "synonym"} +whitespace+"sunny"+whitespace+"b" {to highlight the "bubbly" menu item in pop-up 130E)+enter (Enter) character {to select the "bubbly" menu item from menu 130E} +whitespace+"disposition."

While in some embodiments the user can initiate an editor function using an inline command expression, where the predetermined character sequence and the command are entered inline before any command parameters, the user can initiate an editor function using an inline command expression where command parameter(s) is/are entered inline before the predetermined character sequence and the command in other embodiments. For example, instead of initiating the synonyms editor function using the inline command expression "/synonym sunny", the user can initiate the editor function using the inline command expression "sunny "/synonym" according to some embodiments. In these other embodiments, user entered text immediately preceding the predetermined character sequence and the command text sequence may be treated as a parameter or parameters of an inline content item editor command upon detecting entry of the predetermined character sequence and the command text sequence for the command. For example, the text "sunny" preceding the text "/synonym" may be treated as a parameter to the synonym command upon detecting entry of the text "/synonym" for the command.

Commands That Take Action on the Content Item

The example user interfaces 100A-G of FIGS. 1A-1G illustrate an inline content item editor command that changes the content of the content item in the editing area by replacing the inline content item command expression with a replacement sequence of characters. However, an inline content item editor command may take an action on the content item but may not change the content of the content item in the editing area. An example of this type of inline content item editor command is illustrated in the user interfaces shown in FIGS. 2A-2D.

Figure 2A:
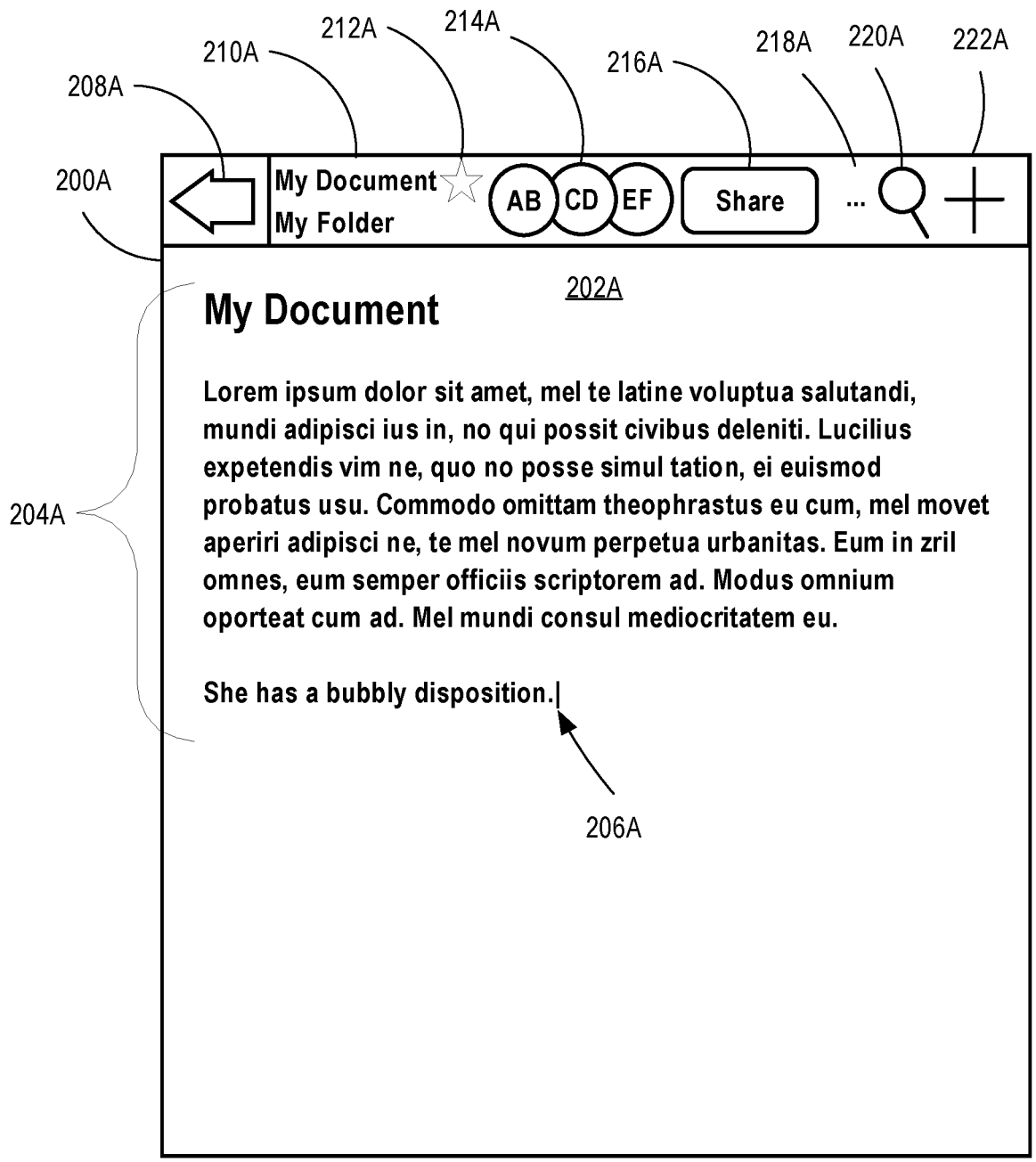
FIGS. 2A-2D illustrate exemplary user interfaces for inline content item editor commands, according to some embodiments.

Turning first to FIG. 2A, it shows UI 200A with editing area 202A where the text cursor 206A is at a current location in the editing area 202A. User interface elements 204A, 208A, 210A, 212A, 214A, 216A, 218A, 220A, and 222A may be like user interface elements 104A, 108A, 110A, 112A, 114A, 116A, 118A, 120A, and 122A of UI 100A (FIG. 1A), respectively.

Figure 2B:
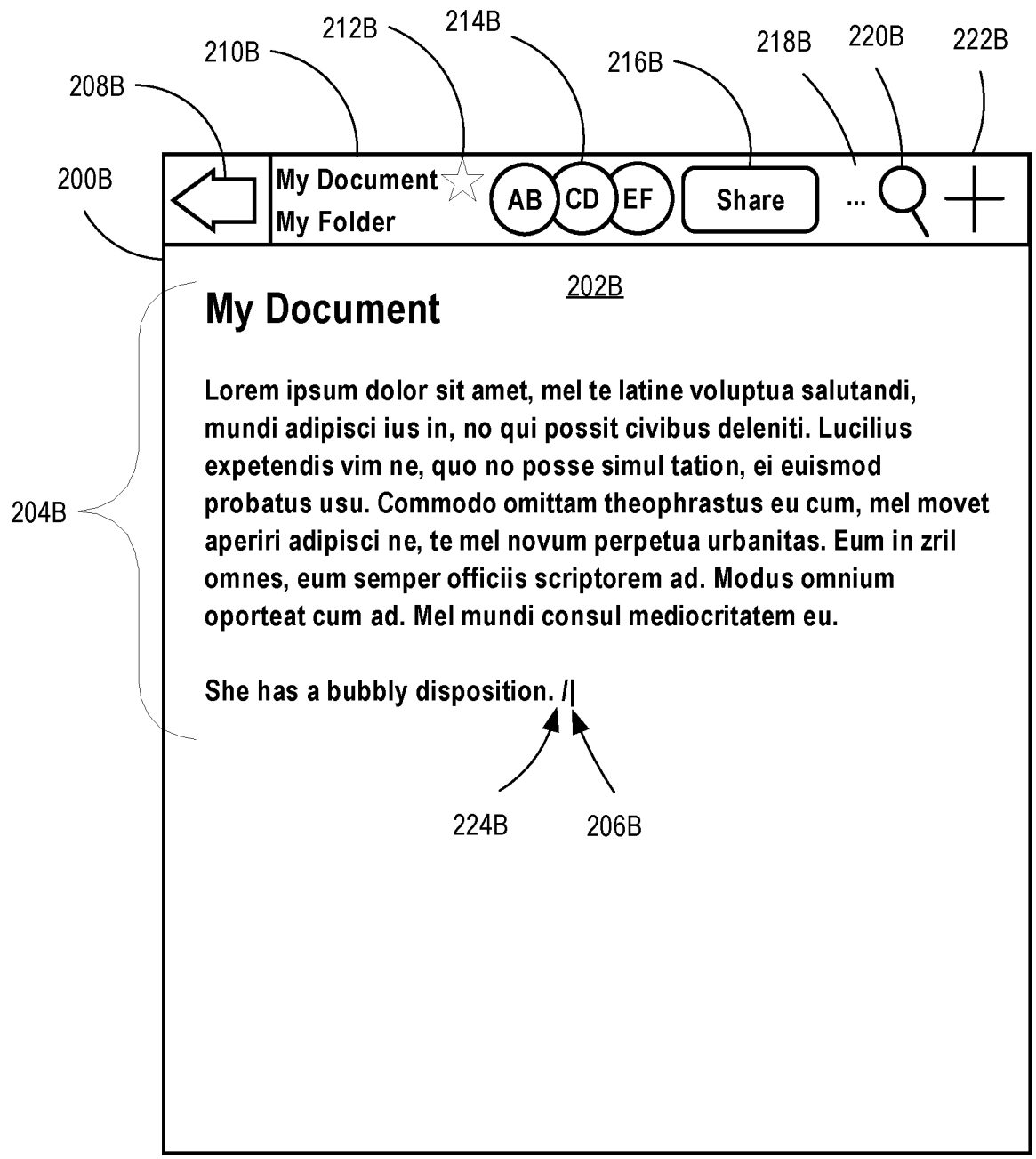

Turning next to FIG. 2B, it shows UI 200B with editing area 202B after the user has entered the predetermined character sequence 224B to start an inline content item editor expression in editing area 202A of UI 200A (FIG. 2A). The current location in the editing area has moved as shown by cursor 206B. User interface elements 204B, 208B, 210B, 212B, 214B, 216B, 218B, 220B, and 222B may be like user interface elements 104A, 108A, 110A, 112A, 114A, 116A, 118A, 120A, and 122A of UI 100A (FIG. 1A), respectively.

Figure 2C:
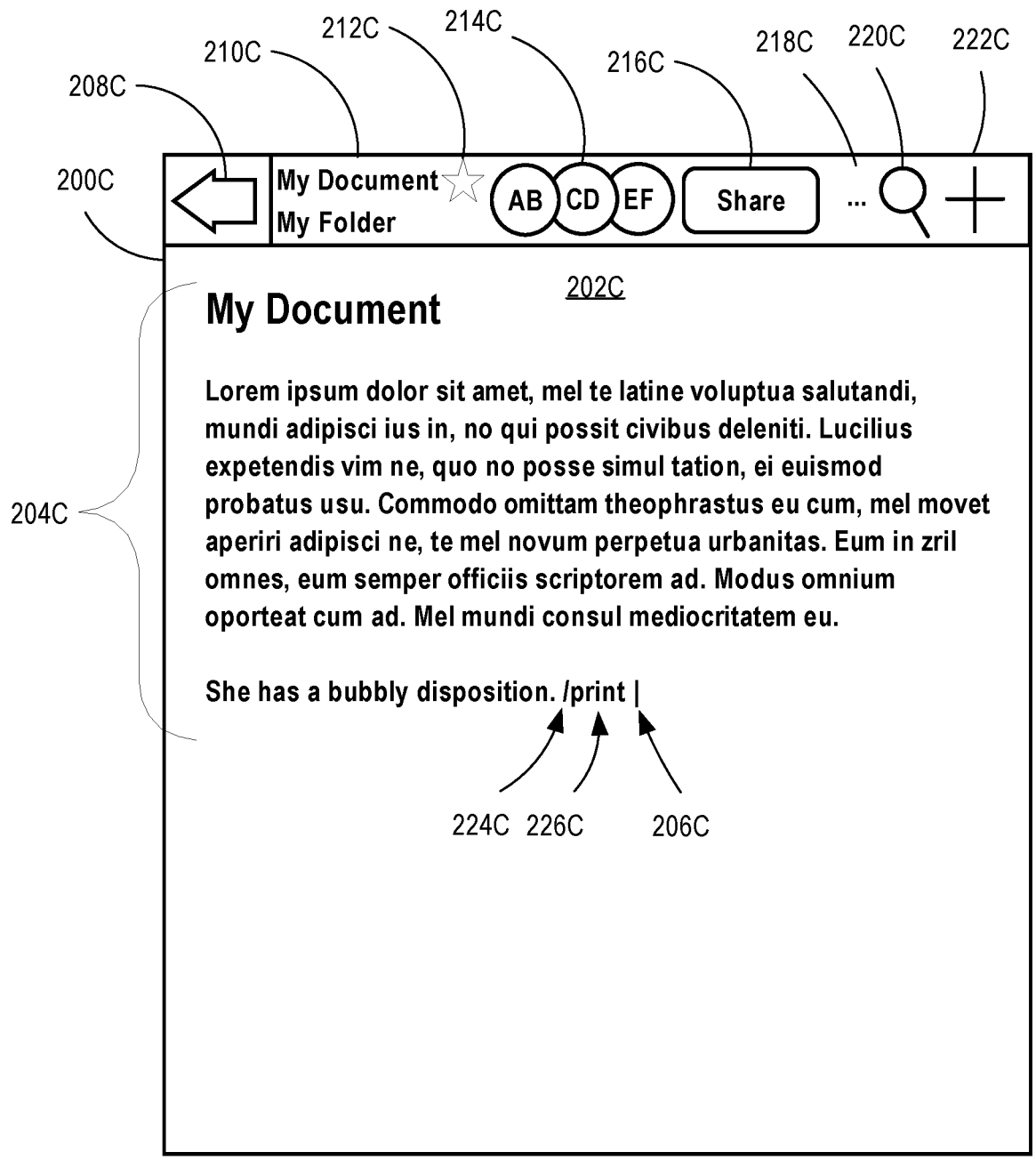

Turning next to FIG. 2C, it shows UI 200C with editing area 202C after the user has entered or selected a character sequence 226C representing the editor function to initiate. The current location in the editing area has moved as shown by cursor 206C. In this example, the editor function is a print function of the content item editing application to print the current contents of the content item to a default or selected, virtual or physical print device. User interface elements 204B, 208B, 210B, 212B, 214B, 216B, 218B, 220B, and 222B may be like user interface elements 104A, 108A, 110A, 112A, 114A, 116A, 118A, 120A, and 122A of UI 100A (FIG. 1A), respectively. Element 224C may be like element 224B of UI 200B (FIG. 2B).

Figure 2D:
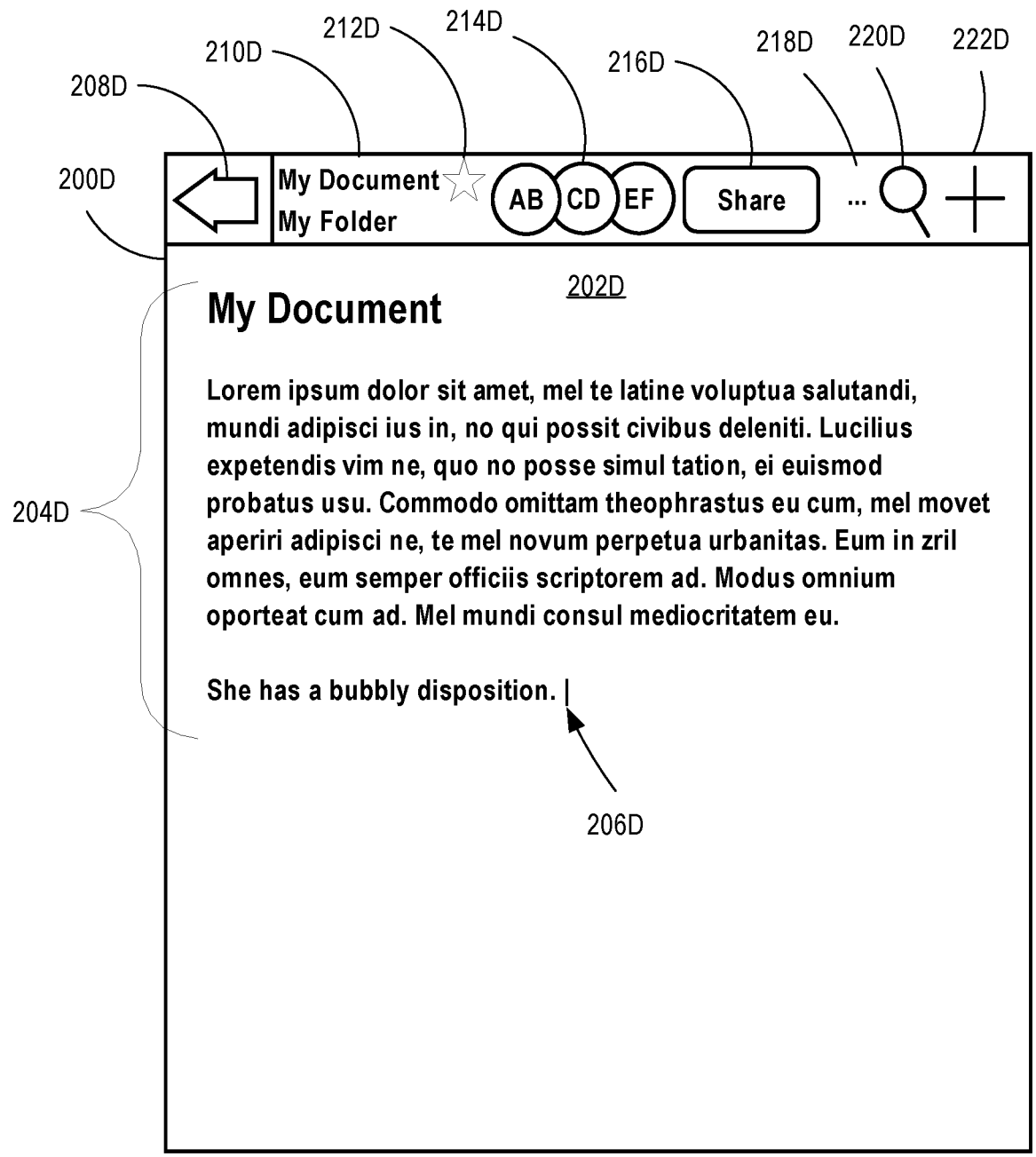

Turning finally to FIG. 2D, it shows UI 200D with editing area 202D after the content item editing application has initiated the print editor function. Significantly, before or upon initiation of the editor function (e.g., printing the content item to a default or selected print device), the content item editing application automatically removes the entered inline content item editor command expression from the editing area 202C and restores the text input cursor 206D to its position where the cursor was at when the user started entering the inline content item editor command expression. After removal of the expression from the editing area 202C, the content item is then printed with the contents as shown in editing area 202D.

Api For Custom Commands

In some embodiments, the content item editing application provides an application program interface (API) whereby custom inline content item expression commands can be implemented.

Figure 3:
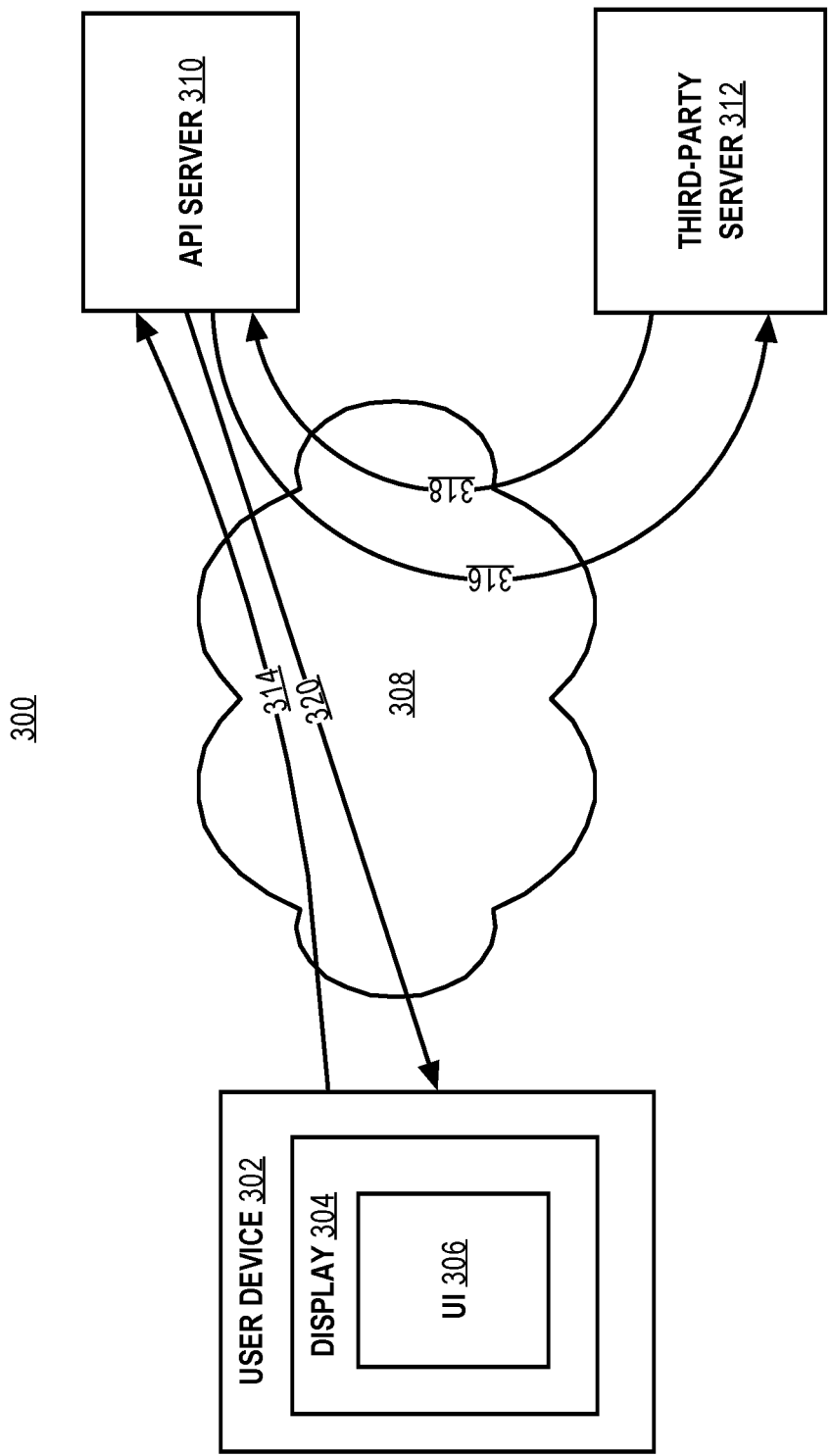
FIG. 3 is a schematic representation of a networked system environment providing an application programming interface supporting custom inline content item editor commands, according to some embodiments.

FIG. 3 depicts a networked system environment 300 supporting an application programming interface (API) for custom inline content item editor commands according to some embodiments. Environment 300 includes a user device 302. The user device 302 has or is operatively coupled to a display 304 displaying a user interface 306. User interface 306 may be like one of user interfaces 100A-100G or 200A-200D described above. The user device 302 is coupled to an API server 310 via a data communications network 308 (e.g., the Internet). Likewise, API server 310 is coupled to a third-party server 312 via network 308.

When a user enters a custom inline content item editor command expression at user device 302, the command name and any parameters provided in the expression are sent 314 to API server 310.

The API server 310 then uses the command name to determine (e.g., in a lookup table) a third-party server 312 that implements the custom command. Once determined, the API server 310 forwards 316 the command name and any parameters provided to the determined third-party server 312. The third party server 312 processes the custom command request and returns 318 a response to the command. The API server 310 then forwards 320 the returned response to the user device 302 for further processing.

The synonym command described above is useful to illustrate operation of the API by an example. After the user enters the inline content item, the user device 302 sends 314 the command name "synonym" and the parameter "sunny" to the API server 310. Based at least on the command name "synonym", the API server 310 identifies third party server 312 as being handle to provide a response to the command. Accordingly, the API server 310 forwards the command name and the parameter to third party server 312. Third party server 312 processes the synonym command by looking up or otherwise determining a list of synonyms to the give word "sunny". The list is returned 318 to user device 302 or to the API server 310 which forwards the list on to user device 302. In some alternate embodiments, the list can be returned directly to user device 302 without using API server 310 as an intermediary. The content item editing application at the user device 302 may present the list in the user interface 306, for example, as part of a pop-up menu like menu 130E of UI 100E (FIG. 1E).

Figure 4:
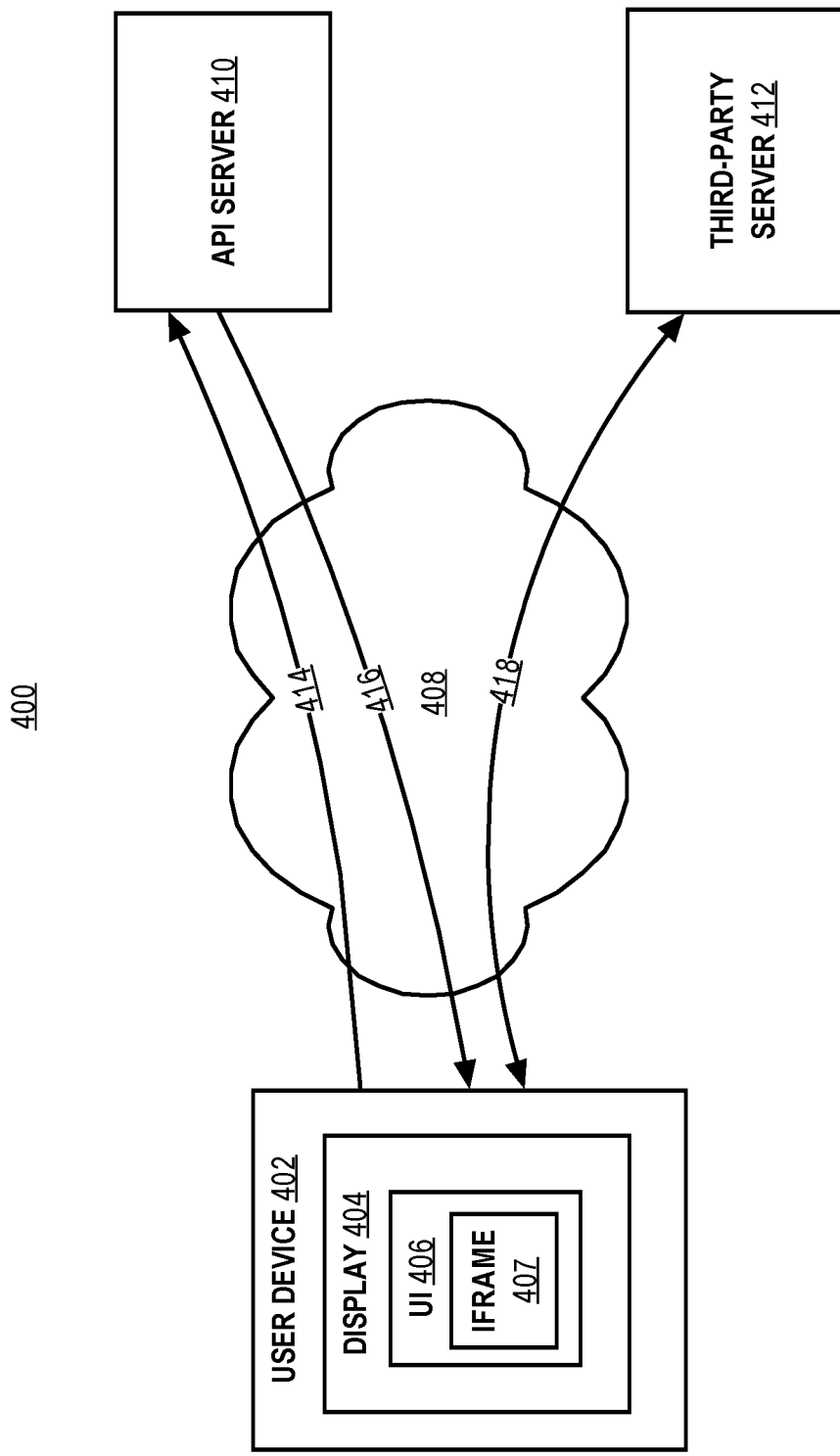
FIG. 4 is a schematic representation of a networked system environment providing an application programming interface as an alternative to the application programming interface of FIG. 3, according to some embodiments.

FIG. 4 depicts a networked system environment 400 supporting an alternative application programming interface (API) for custom inline content item editor commands according to some embodiments. In this alternative, the user interface 406 of the content item editing application comprises an inline user interface element 407 (e.g., a web browser iframe, DIV, etc.) that displays content obtained from a third party server 412 capable of providing a response to the custom command. In this configuration, the user device 402 sends 414 the command name and any parameters to the API server 410 as in the previously described API configuration, but instead of forwarding the command request onto the third-party server 412, the API server 410 returns 416 a uniform resource locator (URL) to a third-party server 412 determined by the API server 410 as capable of providing a response to the custom command.

The content item editing application at the user device 402 uses the URL to communicate 418 with the third-party server 412 in the context of the inline user interface element 407. For example, the pop-up menu 130E of UI 100E may be displayed within an inline user interface element 407 and the displayed content of the menu 130E including the list of synonyms may be provided by the third-party server 412.

While in some cases the URL of the third-party server 412 is provided to the user device 402 by the API server 410, in some implementations, the URL of the third-party server 412 is already stored and associated with the custom command at the user device 402 when the custom command is initiated. For example, the URL may have been received from the API server 410 and cached at the user device 402 in response to previous initiation of the custom command, or the user device 402 may have otherwise already obtained the URL. In this case, the user device 402 may not communicate (e.g., send information 414 or receive response 416) with the API server 410 in response to the current custom command initiation and may instead use the already known URL to communicate 418 with the third-party server 412.

While in some embodiments an API server connected to a network such as server 310 or server 410 is used to facilitate a custom inline content item editor command, the functionality of the API server is implemented at a user device (e.g., device 302 or device 402) in other embodiments. For example, the API server functionality could be implemented by the content item editing application at the user device. Thus, functionality described above as being performed by API server 310 could be implemented and performed by user device 302 instead. In this implementation, information sent to 314 and returned from 320 the API server 310 may be sent to and returned from an API module at the user device 302 instead of over network 308. Similarly, functionality described above as being performed by API server 410 could instead be implemented and performed by user device 402. In this implementation, information sent to 414 and returned from 416 the API server 410 may be sent to and returned from an API module at the user device 502 instead of over network 408.

Example Inline Content Item Editor Commands

In some embodiments, a table inline content item editor command is supported. For example, a corresponding editor function may be initiated with the inline content item editor command expression "/table <dimensions (e.g., 3×2)>", or the like, where <dimensions> represents a parameter for specifying the initial number of rows and columns of the table. Initiation of the editor function may cause an empty table with the specified number of columns and the specified number of rows to be inserted into the editing area replacing the inline command expression with the table.

In some embodiments, a synonym inline content item editor command is supported. For example, a corresponding editor function may be initiated with the inline content item editor command expression "/synonym <word>", or the like, where <word> represents a parameter specifying the word for which a synonym is desired. Upon the user selecting a synonym for the given word, the inline command expression is replaced in the editing area with the selected synonym.

In some embodiments, an image inline content item editor command is supported. For example, a corresponding editor function may be initiated with the inline content item editor command expression "/image" or similar. Initiation of the editor function may cause a pop-up user interface element to be displayed that allows the user to select an image, graphic, or icon. Upon the user selecting a desired image, graphic, or icon, the inline command expression is replaced in the editing area with the selected image. Depending on the implementation of the image command, the set of available images, graphics, or icons from which the user can select may be provided by any of:

- an online service (e.g., a third-party online service),
- a default set of images, graphics, or icons,
- local content (e.g., 704) at the user's client device (e.g., 620),
- content items in a content item database (e.g., 908) of a collaborative content management system (e.g., 630), and/or
- content storage (e.g., 818) of a content management system (e.g., 600).

In some embodiments, a photo inline content item editor command is supported. For example, a corresponding editor function may be initiated with the inline content item editor command expression "/photo" or the like. Initiation of the editor function may cause a pop-up user interface element to be displayed that allows the user to select a digital photo such as a photo among a digital photo collection accessible by the editing user (e.g., the user's personal photos). Upon the user selecting a desired photo, the inline command expression is replaced in the editing area with the selected photo (e.g., in full resolution or thumbnail form). Depending on the implementation of the image command, the set of digital photos from which the user can select may be provided by any of:

- an online service (e.g., a third-party digital photo management service),
- a default set of images, graphics, or icons,
- digital photos stored as part of local content (e.g., 704) at the user's client device (e.g., 620),
- digital photos in a content item database (e.g., 908) of a collaborative content management system (e.g., 630), and/or
- digital photos stored as part of content storage (e.g., 818) of a content management system (e.g., 600).

In some embodiments, a calculator inline content item editor command is supported. For example, a corresponding editor function may be initiated with the inline content item editor command expression "/calculator" or the like. Initiation of the editor function may cause an interactive pop-up calculator widget to be displayed that allows the user to perform a calculation using a calculator-like user interface. Upon making the calculation, the inline command expression is replaced in the editing area with the result of the calculation.

In some embodiments, a calculate inline content item editor command is supported. For example, a corresponding editor function may be initiated with the inline content item editor command expression "/calculate <expression>", or the like, where <expression> represents a parameter for specifying a mathematical expression to be calculated. Initiation of the editor function may cause the expression parameter to be calculated. Upon making the calculation, the inline command expression is replaced in the editing area the result of the calculation. For example, "/calculate $1,500×12" may be replaced by "$18,000" where "$18,000" is obtained as part of output of the editor function.

In some embodiments, a map inline content item editor command is supported. For example, a corresponding editor function may be initiated with the inline content item editor command expression "/map" or the like. Initiation of the editor function may cause an interactive pop-up geographical map to be displayed that allows the user to select a location on the map (e.g., a map provided by an online mapping service (e.g., GOOGLE MAPS)). Upon making the selection, the inline command expression is replaced in the editing area with a text representation of the selected location such as the closest mailing address to the selected location, geographic coordinates, or a hyperlink to the map. In some embodiments, a parameter of the "/map" command specifies an initial geographic location. For example, a user may enter into the editing area the contents "Let's meet at the Russian Tea Room at /map new york, new york" which will initiate the map editor function displaying a map of New York City. Once the user selects the location on the map of the location of the Russian Tea Room the contents "Let's meet at the Russian Tea Room at 150 W 57th St, New York, N.Y. 10019" may be displayed in the editing area where the address of the Russian Tea Room is obtained as part of output of the editor function.

In some embodiments, a table of contents content item editor command is supported. For example, a corresponding editor function may be initiated with the inline content item editor command expression "/toc" or the like. Initiation of the editor function may cause the inline command expression to be replaced in the editing area with a table of contents for the content item being edited. The table of contents may be generated based on pre-tagged headings used in the contents of the content item.

In some embodiments, a message inline content item editor command is supported. For example, a corresponding editor function may be initiated with the inline content item editor command expression "/msg <user>'<msg>'", or the like, where <msg> represents a parameter specifying a sequence of characters to send to a user designated by the <user> parameter. In some implementations, the message may be determined based on indicators such as quotes specifying when the user has finished entering the message. Initiation of the editor function may cause the inline command expression to be replaced in the editing area with a response message from the user. The response message may be received as part of output of the editor function. For example, the editing user may enter the inline command expression "/msg @bob 'Can you send me the link to that delicious lasagna recipe?'". The user @bob may be notified by e-mail or text message or other messaging mechanism. The user @bob may then reply to the editing user's message using the same messaging mechanism by which the editing user's message was received (e.g., by reply e-mail or reply text message). For example, the user @bob may receive an e-mail from the editing user where the body of the message includes the text "Can you send me the link to that delicious lasagna recipe?" The user @bob may e-mail reply to the editing user's e-mail message with a URL to a website providing the requested recipe or with a description of the recipe. In this example, the output of the editor function may include the contents of user @bob's reply message and the content item editing application may replace the inline content item editor command expression in the editing area with the reply contents. In some implementations, the user may continue to edit or even close the content item before the response is received, but the reply message can still be used to replace the inline command.

In some embodiments, view history command is supported. For example, a corresponding editor function may be initiated with the inline content item editor command expression "/viewhistory" or the like. Initiation of this edit function may allow the user to examine viewing history associated with the content item being edited such as who has viewed the content item and when they viewed the content item.

In some embodiments, a current word count command is supported. For example, a corresponding editor function may be initiated with the inline content item editor command expression "/wordcount or the like. Initiation of this editor function may provide a current word count of the words of the contents in the editing area for the content item being edited.

In some embodiments, a print command is supported. For example, a corresponding editor function may be initiated with the inline content item editor command expression "/print" or the like. Initiation of this editor function may cause the current contents of the content item in the editing area to be printed to a default virtual or physical print device. In some implementations, the print command can take a parameter indicating to which printer the content item should be printed. In some implementations, the print command can open a print menu.

In some embodiments, a download command is supported. For example, a corresponding editor function may be initiated with the inline content item editor command expression "/download" or the like. Initiation of this editor function may cause a copy of the content item being edited to be download to the user's client device.

In some embodiments, a move command is supported. For example, a corresponding editor function may be initiated with the inline content item editor command expression "/move" or the like. Initiation of this editor function may allow the user to move the location of the content item from its current location in a folder hierarchy to a new location within the folder hierarchy. In some implementations, the move command can take a parameter specifying a destination to which to move the content item. In some implementations, the move command can open a menu with a file chooser for the user to select a destination for the content item.

In some embodiments, a link command is supported. For example, a corresponding editor function may be initiated with the inline content item editor command expression "/link" or the like. In some implementations, a content item to reference in a link can be indicated as a parameter to the /link command e.g., by specifying a content item title for a content item the user can access in a content management system (e.g., 600). In some implementations, initiation of this editor function may allow the user to select one of the user's content items hosted with a content management system (e.g., 600). In response to selecting a content item, a unique reference to the selected content item generated by the content management system (e.g., by sharing module 810) may be embedded at the current editing location in the editing area. The unique reference can a Uniform Resource Locator (URL), hyperlink, or other type of content item reference. The unique reference can be displayed as an embedded preview of the content item. For example, the embedded preview may include a digital image (e.g., thumbnail preview) or digital video preview of the content item, or a portion thereof In some embodiments, a file command is supported. For example, a corresponding editor function may be initiated with the inline content item editor command expression "/file" or the like. The file command may be similar to the link command in that, in some implementations, a content item to reference in a link can be indicated as a parameter to the /link command or the user can select a content item from a file chooser, e.g. a file hosted with a content management system (e.g., 600). However, instead of embedding a link to the content item in the editing area, the contents of the selected content item are embedded in the editing area at the current editing location.

In some embodiments, a share command is supported. For example, a corresponding editor function may be initiated with the inline content item editor command expression "/share" or the like. Initiation of this editor function may allow the editing user to share the content item being edited with one or more other users of a content item management system (e.g., 600) via a sharing module (e.g., 810). The target user and sharing permission may be specified as parameters to the share command or may be selected through menus.

In some embodiments, a comment command is supported. For example, a corresponding editor function may be initiated with the inline content item editor command expression "/comment" or the like. Initiation of this editor function allows the user to embed a comment at the current editing location in the editing area. The comment command may take a parameter, e.g., specified between quotes, indicating content to include in the comment.

In some embodiments, a template command is supported. For example, a corresponding editor function may be initiated with the inline content item editor command expression "/template" or the like. Initiation of this editor function allows the user to embed predefined content from a selected template. The selected template may also be specified as a parameter to the command.

In some embodiments, an antonym command is supported. For example, a corresponding editor function may be initiated with the inline content item editor command expression "/antonym <word>" or the like. This command may operate similarly to the synonym command described above except that the output of the editor function provides an antonym for the given word instead of a synonym.

In some embodiments, a memes command is supported. For example, a corresponding editor function may be initiated with the inline content item editor command expression "/memes" or the like. This command may operate similar to the image and photo commands described above except that this command may be used to select a meme to embed at the current location in the editing area instead of an image, graphic, icon, or photo.

In some embodiments, a task command is supported. For example, a corresponding editor function may be initiated with the inline content item editor command expression "/task" or the like. This command may be used to embed a task list item that is linked to a third-party task management service. The task list item may be represented in the content item is a checkbox and associated task description. The task description may be provided as a parameter to the task command expression, for example. Alternatively, the task description may be entered into a pop-up, overlay or iframe window that is driven by the third-party task management service. In either case, the output of the function may replace the inline content item editor command expression with a checkbox and the associated task description. The checkbox may be linked to the third-party task management service such that when a user toggles the checkbox in the content item (i.e., from checked to unchecked or from unchecked to checked), the third-party task management service is notified (e.g., by a network message sent from the user's computing device). The third-party task management service can then process the notification accordingly. For example, the third-party task management service may notify other users registered with the third-party task management service to receive notification when the task is completed. Similarly, if a user using the third-party task management service updates the task to indicate that it is complete, this may be reflected by the checkbox in the content item. For example, when the content item is loaded for display, the link associated with the checkbox may be automatically navigated to obtain the current task status from the third party task management service. The checkbox in the content item may then be updated accordingly based on the current task status.

Example Process

Figure 5B:
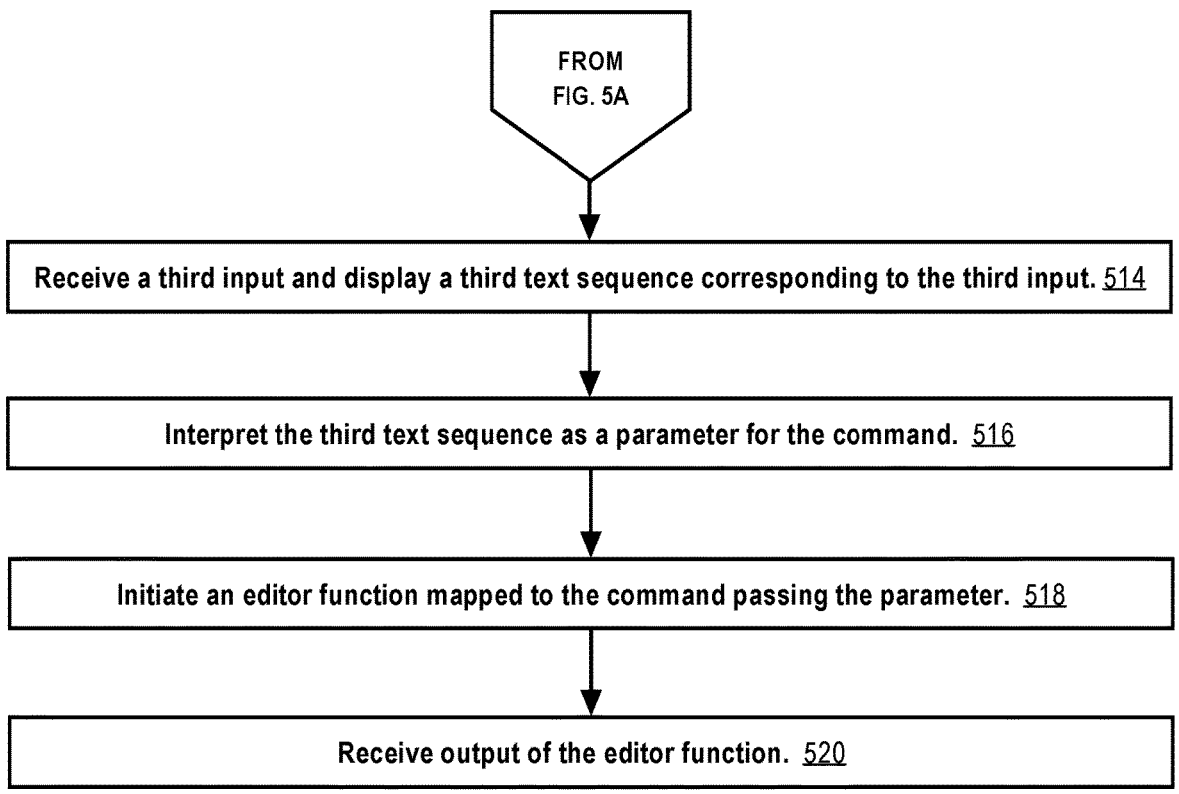
Figure 5C:
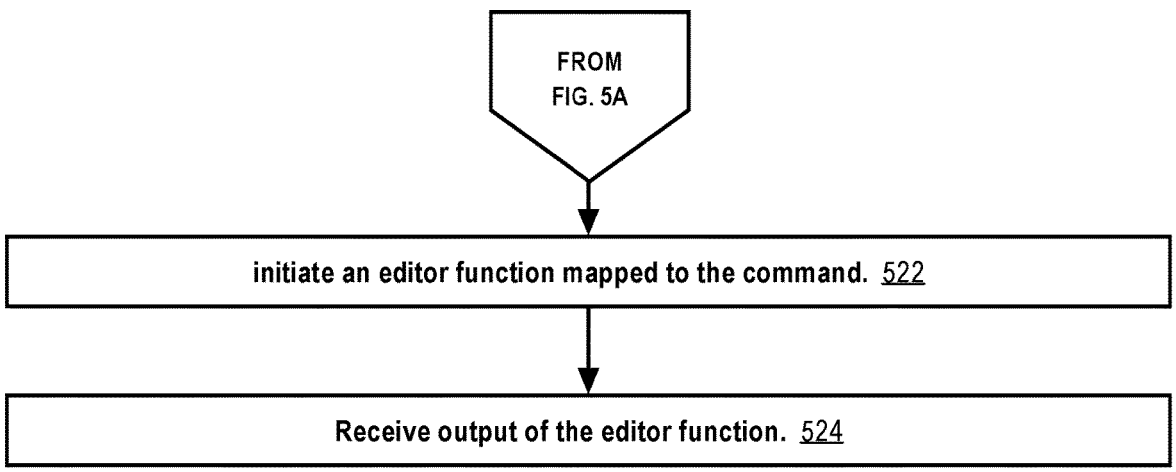

FIG. 5A, FIG. 5B, and FIG. 5C show a flow diagram illustrating process 500 for implementing an inline content item editor command according to some embodiments. Process 500, when performed by one or more computing devices, increases the effectiveness, efficiency, and user satisfaction with computing devices configured with a content item editing application for editing content items by allowing the user to initiate an editor function using an inline content item editor command expression without losing context of the current editing location.

The processes 500 may be performed by one or more computing devices (e.g., hardware machine 1000 configured with software system 1100). Some operations in the processes 500 may be combined and/or the order some operations may be changed in other embodiments.

In some embodiments, some or all of the operations of process 500 are performed, at least in part, by a client device such as, for example, a client device 620 described below. In some embodiments, some or all of the operations of process 500 are performed, at least in part, by a content item editing application at a client device such as, for example, collaborative content item editor 770 described below. While in some embodiments, some of the operations of the process 500 are performed, at least in part, at a client device, in other embodiments, some of the operations of process 500 are performed, at least in part, by one or more server devices. For example, some of the operations of process 500 may be performed, at least in part, by one or more servers of content management system 500 described below and/or one or more servers of collaborative content management system 630 described below.

The operations of process 500 will now be described with reference to FIGS. 1A-1G, FIGS. 2A-2D, and FIGS. 6-9.

Turning first to FIG. 5A, at operation 502, an editing area (e.g., 102A or 202A) of a collaborative content item editor is displayed in a graphical user interface (e.g., 100A or 200A) on a display (e.g., 710) of a client device (e.g., 620). The editing area may be for editing contents (e.g., 104A or 204A) of a collaborative content item. While process 500 is described in terms of collaborative content items, it can be performed in relation to other content items as well. The editing area can also include a text input cursor (e.g., 106A or 206A) in the editing area. The text input cursor can be displayed at a location in the editing area. The displaying may be performed by an operating system (e.g., 750), a web browser (e.g., 760), a collaborative content item editor (e.g., 770) of the client device, or any combination thereof. In addition, or alternatively, the displaying may be performed by one or more servers (e.g., 902 and/or 904) of a collaborative content management system (e.g., 630) by, for example, sending information for display over a network (e.g., 610) to the client device.

At operation 504, a first input is received. The first input may correspond to a first text sequence (e.g., 124B or 224B). The first input may be received from a user via a text input mechanism (e.g., keyboard, mouse, touchscreen, etc.) of the client device. The receiving may be performed by the operating system, the web browser, the collaborative content item editor of the client device, or any combination thereof. In addition, or alternatively, the receiving may be performed by one or more servers of the collaborative content management system by, for example, receiving the first text sequence for processing over the network from the client device.

Also at operation 504, the first text sequence corresponding to the first input is displayed in a graphical user interface (e.g., 100B or 200B) on the display of the client device. The displaying may be performed by the operating system, the web browser, the collaborative content item editor of the client device, or any combination thereof. In addition, or alternatively, the displaying may be performed by one or more servers of the collaborative content management system by, for example, sending information for display over the network to the client device.

At operation 506, a determination is made that the first text sequence matches a predetermined character sequence indicating the start of an inline content item editor command expression. This determination may involve comparing the first text sequence to the predetermined character sequence on a character by character basis in order of the characters in the sequences to verify that all characters in the sequences match in order. For example, if the predetermined character sequence is a single forward slash character '/' and the first text sequence is also a single forward slash character '/', then the sequences match. In some embodiments, the first text sequence is stripped of any surrounding whitespace before the comparison is performed. The determination can be performed by the operating system, the web browser, the collaborative content item editor of the client device, or any combination thereof. In addition, or alternatively, the determination may be performed by one or more servers of the collaborative content management system by, for example, receiving the first text sequence over the network from the client device, comparing the received first text sequence against the predetermined character sequence, and returning an appropriate response over the network to the client based on results of the comparing.

At operation 508, a second input is received. The second input may correspond to a second text sequence (e.g., 126C or 226C). The second input may be received from a user via a text input mechanism (e.g., keyboard, mouse, touchscreen, etc.) of the client device. The receiving may be performed by the operating system, the web browser, the collaborative content item editor of the client device, or any combination thereof. In addition, or alternatively, the receiving may be performed by one or more servers of the collaborative content management system by, for example, receiving the first text sequence for processing over the network from the client device. In some implementations, the second input, instead of being specified by textual input from a user, the user can select an option, e.g. from a dropdown that appears upon recognizing the first text sequence. Each item in the dropdown can be mapped to a particular function, e.g. the functions discussed above.

Also at operation 508, the second text sequence corresponding to the second input is displayed in a graphical user interface (e.g., 100C or 200C) on the display of the client device. The displaying may be performed by the operating system, the web browser, the collaborative content item editor of the client device, or any combination thereof. In addition, or alternatively, the displaying may be performed by one or more servers of the collaborative content management system by sending information for display over the network to the client device.

At operation 510, the second text sequence is interpreted as referring to an inline content item editor command based, at least in part, on the determining at operation 508 that the first text sequence matches the predetermined character sequence indicating the start of an inline content item editor command expression. This interpretation may involve determining, as the second text sequence, a subsequent sequence of characters that were input immediately following the first text sequence (e.g., without intervening whitespace between the first text sequence and the subsequent sequence of characters). This interpretation may also involve matching the subsequent sequence of characters to a known inline content item editor command name on a character by character basis until the subsequent sequence of characters unambiguously refers to one known inline content item editor command of a set of available inline content item editor commands. If a character is input that causes the subsequent sequence of characters to not match and a known inline content item editor command name, then the subsequent sequence of characters can be interpreted as not referring to an inline content item editor command. In some implementations, instead of separately determining that the predetermined character sequence matches the first text sequence (block 506) and determining that the second text sequence matches a command (block 510), both of these operations can be performed together at block 510 (e.g., matching "/print" input to an established "/print" command). The interpretation at operation 510 can be performed by the operating system, the web browser, the collaborative content item editor of the client device, or any combination thereof. In addition, or alternatively, the interpretation may be performed by one or more servers of the collaborative content management system by, for example, receiving the subsequent sequence of characters over the network from the client device for interpretation and returning an appropriate respond to the client based on results of the interpretation.

At operation 512, a determination is made whether the inline content item editor command selected at operation 510 accepts one or more inline parameters. This determination may involve looking up information in a mapping data structure (e.g., an associative array) that associates the command (e.g., by an identifier, such as a name, of the command) with information specifying whether the command accepts any parameters. The determination can be performed by the operating system, the web browser, the collaborative content item editor of the client device, or any combination thereof. In addition, or alternatively, the determination may be performed by one or more servers of the collaborative content management system by, for example, receiving the identifier of the selected command over the network from the client device, consulting a server-side mapping data structure using the received command identifier to determine whether any parameters are accepted, and returning an appropriate response over the network to the client device based on results of the consulting. In some implementations, parameters may not be supported; thus, block 512 would not be performed and instead, process 500 would proceed from block 510 to block 522 of FIG. 5C.

Turning now to FIG. 5B, if it is determined at operation 512 that the selected command does accept one or more parameters, then, at operation 514, a third input is received. The third input may correspond to a third text sequence (e.g., 128D). The third input may be received via a text input mechanism (e.g., keyboard, mouse, touchscreen, etc.) of the client device. The receiving may be performed by the operating system, the web browser, the collaborative content item editor of the client device, or any combination thereof. In addition, or alternatively, the receiving may be performed by one or more servers of the collaborative content management system by, for example, receiving the first text sequence for processing over the network from the client device.

Also at operation 514, the third text sequence corresponding to the third input is displayed in a graphical user interface (e.g., 100D) on the display of the client device. The displaying may be performed by the operating system, the web browser, the collaborative content item editor of the client device, or any combination thereof. In addition, or alternatively, the displaying may be performed by one or more servers of the collaborative content management system by, for example, sending information for display over the network to the client device.

At operation 516, the third text sequence is interpreted as referring to a parameter for the inline content item editor command selected at operation 510. This interpretation may involve determining, as the third text sequence, a subsequent sequence of characters that were input following the second text sequence, which may have intervening whitespace, ".", or other separator between the second text sequence and the subsequent sequence of characters. The interpretation can be performed by the operating system, the web browser, the collaborative content item editor of the client device, or any combination thereof. In addition, or alternatively, the interpretation may be performed by one or more servers of the collaborative content management system by, for example, receiving the subsequent sequence of characters over the network from the client device for interpretation and returning an appropriate respond to the client device based on results of the interpretation.

Operations 514 and 516 may be repeated for additional parameters for the selected command. In some implementations, for commands that can take a variable number of parameters, operations 514 and 516 can be performed for each text sequence following the command text sequence that starts with a designated character sequence, such as ".". For example, the command /share may receive any number of sharing recipients. Accordingly, process 500 can interpret the command "/share.@Tom.@Shelly.@Chantel" as a command to share the current collaborative content item with the users that have usernames Tom, Shelly, and Chantel.

At operation 518, an editor function mapped to the selected command is initiated, passing the parameter(s) obtained at operations 514 and 516. The mapping between the selected command and the editor function may be established by a mapping data structure (e.g., an associative array) that associates identifiers of the available inline content item editor command to corresponding initiation information (and possibly other information) pertaining to the commands. The mapping data structure may be stored at the client and/or at one or more servers of the collaborative content item management system. The initiation information for the selected command may specify how to initiate the editor function. For example, the initiation information may indicate whether the editor function can be initiated at the client device (e.g., via a specified local API call) or whether the editor function can be initiated over the network via a remote procedure call (RPC) to a server (e.g., a server of the collaborative content item management system or a third-party server such as third party server 312 or 412 described above). The editor function may execute locally at the client. When initiated, the editor function may invoke client-side functionality such as functionally of the collaborative content item editor at the client, invoke functionality of another application at the client (e.g., client application 700), and/or invoke functionality of the web browser and/or operating system at the client. In addition, or alternatively, the editor function may invoke server-side functionality (e.g., a server of the collaborative content item management system or a third-party server such as third party server 312 or 412 described above).

After being initiated, the editor function may perform various actions with respect to the collaborative content item including changing the contents of the collaborative content item as displayed in the editing area or taking an action on the collaborative content item within the editing context (e.g., based on the contents of the collaborative content item as currently displayed in the editing area) or outside the editing context (e.g., based on a copy of the collaborative content item). The editor function may display one or more pop-up menus or other graphical user interface element(s), or sequences thereof (e.g., 130E) for obtaining additional user input.

Initiation of the editor function at operation 518 can be performed by the operating system, the web browser, the collaborative content item editor of the client device, or any combination thereof. In addition, or alternatively, the initiation may be performed by one or more servers of the collaborative content management system by, for example, receiving a command from the client to initiate a server-side editor function.

At operation 520, output of the editor function is received. The output may include an indication of whether the editor function successfully performed an operation. If the inline content item editor command changes the displayed contents (e.g., 104E) of the collaborative content item being edited, the output may include content (e.g., a text sequence such as 134F, graphics, images, video, audio, tables, lists, links, a code sequence, etc.) for replacing in an editing area (e.g., 102E) the entered inline content item editor command expression or for changing some other portion of the collaborative content item. For example, the "/updateTitle 'My Title'" command can tell the collaborative content item editor to change the title of the current collaborative content item, without having to scroll up to where the title is displayed. The result will be to remove "/updateTitle 'My Title'" from the editing area and change the title to "My Title". In some embodiments where the inline content item editor command does not change the displayed contents of the collaborative content item being edited, the entered inline content item editor command expression is removed from the editing area (e.g., 202C) before or in conjunction with initiating the editor function (e.g., as part of operation 518). Receiving output of the editor function may be performed by the operating system, the web browser, the collaborative content item editor of the client device, or any combination thereof. In addition, or alternatively, the receiving may be performed by one or more servers of the collaborative content management system by, for example, receiving the output from a server-side editor function and then sending some or all of the output over the network to the client.

Turning now to FIG. 5C, if it is determined at operation 512 that the selected command does not accept one or more parameters, then, the editor function is initiated at operation 522 like at operation 518 described above except that no parameters are passed to the editor function. Output of the editor function is then received at operation 524 like operation 520 described above.

Content Management System

Figure 6:
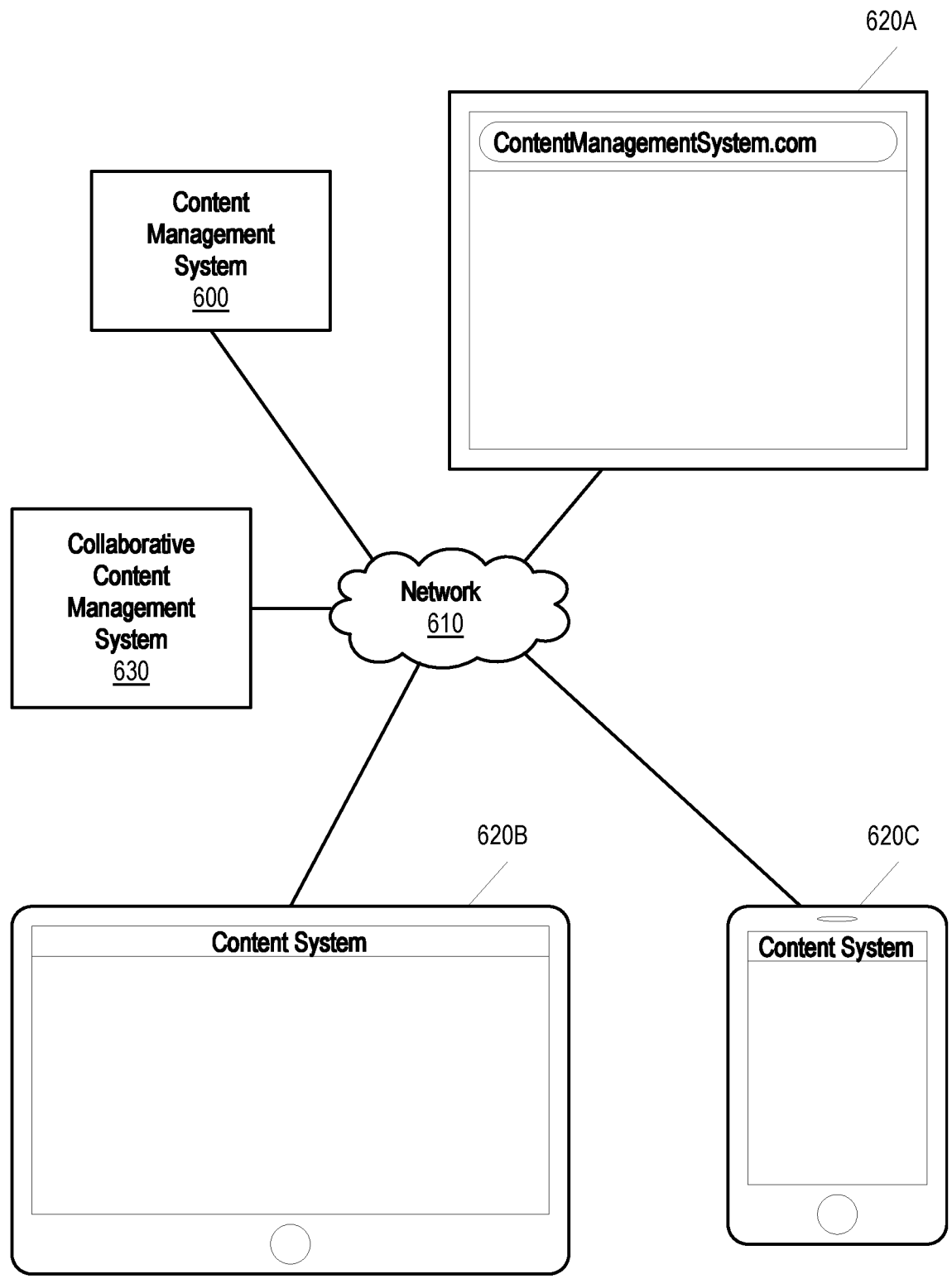
FIG. 6 is a schematic representation of a system environment including a content management system, a collaborative content management system, and client devices, according to some embodiments.

FIG. 6 shows a system environment including content management system 600, collaborative content management system 630, and client devices 620A, 620B, 620C (collectively or individually "620"). Content management system 600 provides functionality for sharing content items with one or more client devices 620 and synchronizing content items between content management system 600 and one or more client devices 620.

The content stored by content management system 600 can include any type of content items, such as documents, collaborative content items, text files, audio files, image files, video files, webpages, executable files, binary files, placeholder files that reference other content items, etc. In some embodiments, a content item can be a portion of another content item, such as an image that is included in a document. Content items can also include collections, such as folders, namespaces, playlists, albums, etc., that group other content items together. The content stored by content management system 600 may be organized in one configuration in folders, tables, or in other database structures (e.g., object oriented, key/value etc.).

In some embodiments, content stored by content management system 600 includes content items created using third party applications, e.g., word processors, video and image editors, database management systems, spreadsheet applications, code editors, and so forth, which are independent of content management system 600.

In some embodiments, content stored by content management system 600 includes content items, e.g., collaborative content items, created using a collaborative interface provided by collaborative content management system 630. In some embodiments, collaborative content items can be stored by collaborative content item management system 630, with content management system 600, or external to content management system 600. A collaborative interface can provide an interactive content item collaborative platform whereby users (e.g., one or more individuals, one or more user accounts for individuals, one or more user accounts for organizations, one or more scripts or programs, etc.) can simultaneously create and edit collaborative content items, comment in the collaborative content items, and manage tasks within the collaborative content items.

Users may create accounts at content management system 600 and store content thereon by sending such content from client device 620 to content management system 600. The content provided by users and associated with user accounts may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 620 communicate with content management system 600 and collaborative content management system 630 through network 610. The network may be any suitable communications network for data transmission. In some embodiments, network 610 is the Internet and uses standard communications technologies and/or protocols. Thus, network 610 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 610 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over network 610 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

In some embodiments, content management system 600 and collaborative content management system 630 are combined into a single system. The system may include one or more servers configured to provide the functionality discussed herein for the systems 600 and 630.

Client Device

Figure 7:
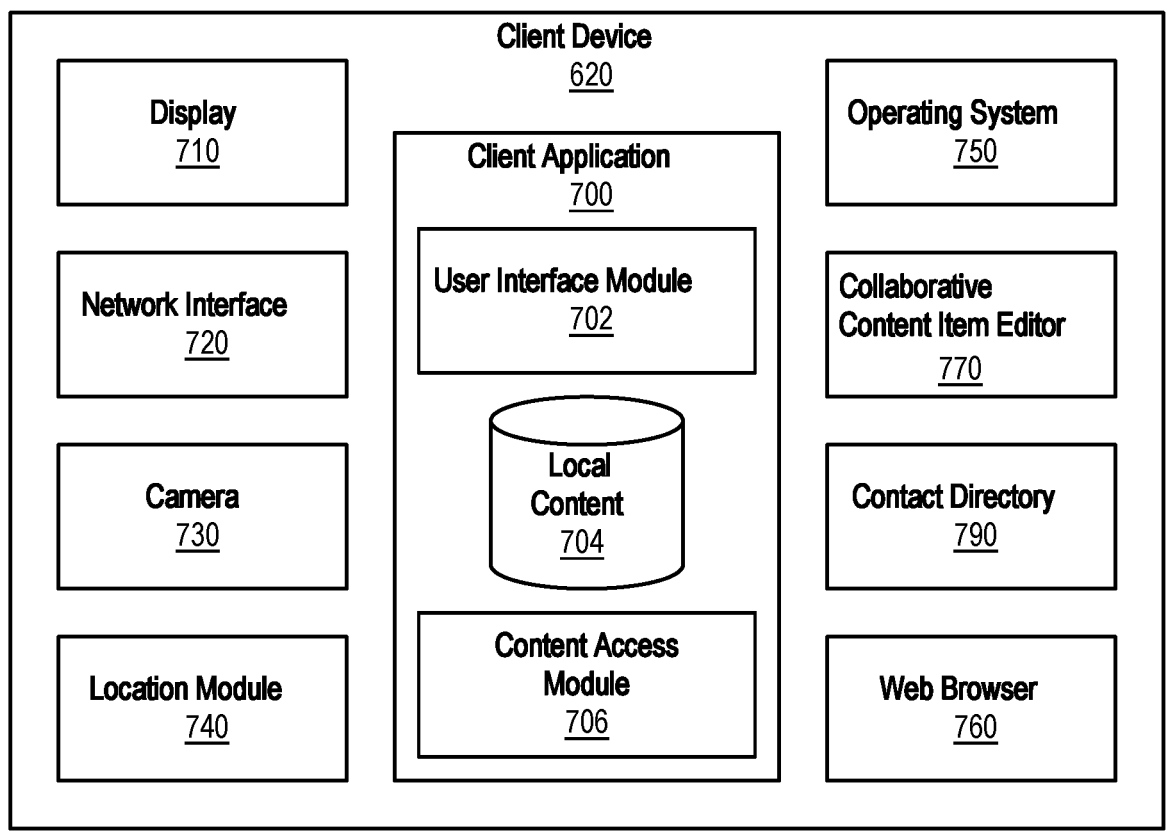
FIG. 7 is a schematic representation a client device, according to some embodiments.

FIG. 7 shows a block diagram of the components of a client device 620 according to one embodiment. Client devices 620 generally include devices and modules for communicating with content management system 600 and a user of client device 620. Client device 620 includes display 710 for providing information to the user, and in certain client devices 620 includes a touchscreen. Client device 620 also includes network interface 720 for communicating with content management system 600 via network 610. Other components of a client device 620 that are not material are not shown, for example, one or more computer processors, local fixed memory (RAM and ROM), as well as optionally removable memory (e.g., SD-card), power sources, and audio-video outputs.

In certain embodiments, client device 620 includes additional components such as camera 730 and location module 740. Location module 740 determines the location of client device 620, using, for example, a global positioning satellite signal, cellular tower triangulation, or other methods. Location module 740 may be used by client application 700 to obtain location data and add the location data to metadata about a content item.

Client devices 620 maintain various types of components and modules for operating the client device and accessing content management system 600. The software modules include operating system 750 and optionally a collaborative content item editor 770. Collaborative content item editor 770 is configured for creating, viewing and modifying collaborative content items such as text documents, code files, mixed media files (e.g., text and graphics), presentations or the like. Operating system 750 on each device provides a local file management system and executes the various software modules such as content management system client application 700 and collaborative content item editor 770. A contact directory 790 stores information on the user's contacts, such as name, telephone numbers, company, email addresses, physical address, website URLs, and the like.

Client devices 620 access content management system 600 and collaborative content management system 630 in a variety of ways. Client device 620 may access these systems through a native application or software module, such as content management system client application 700. Client device 620 may also access content management system 600 through web browser 760. As an alternative, the client application 700 may integrate access to content management system 600 with the local file management system provided by operating system 750. When access to content management system 600 is integrated in the local file management system, a file organization scheme maintained at content management system is represented as a local file structure by operating system 750 in conjunction with client application 700.

Client application 700 manages access to content management system 600 and collaborative content management system 630. Client application 700 includes user interface module 702 that generates an interface to the content accessed by client application 700 and is one means for performing this function. The generated interface is provided to the user by display 710. Client application 700 may store content accessed from a content storage at content management system 600 in local content 704. While represented here as within client application 700, local content 704 may be stored with other data for client device 620 in non-volatile storage. When local content 704 is stored this way, the content is available to the user and other applications or modules, such as collaborative content item editor 770, when client application 700 is not in communication with content management system 600 or collaborative content item management system 630. Content access module 706 manages updates to local content 704 and communicates with content management system 600 to synchronize content modified by client device 620 with content maintained on content management system 600, and is one means for performing this function. Client application 700 may take various forms, such as a stand-alone application, an application plug-in, or a browser extension.

Content Management System

Figure 8:
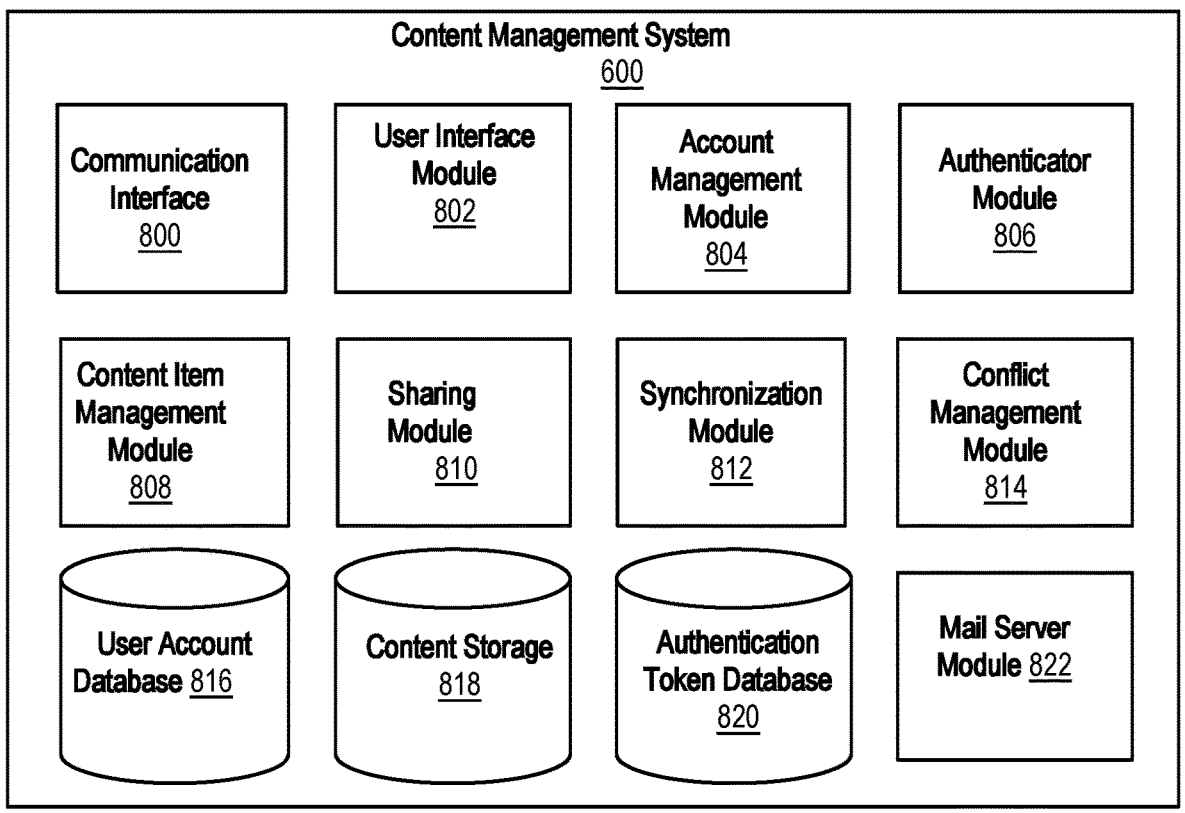
FIG. 8 is a schematic representation of a content management system, according to some embodiments.

FIG. 8 shows a block diagram of the content management system 600 according to some embodiments. To facilitate the various content management services, a user can create an account with content management system 600. The account information can be maintained in user account database 816, and is one means for performing this function. User account database 816 can store profile information for registered users. In some cases, the only personal information in the user profile is a username and/or email address. However, content management system 600 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on corresponding identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 816 can also include account management information, such as account type, e.g., free or paid; usage information for each user, e.g., file usage history; maximum storage space authorized; storage space used; content storage locations; security settings; personal configuration settings; content sharing data; etc. Account management module 804 can be configured to update and/or obtain user account details in user account database 816. Account management module 804 can be configured to interact with any number of other modules in content management system 600.

An account can be used to store content items from one or more client devices associated with the account. Content items can be shared with multiple users and/or user accounts. In some embodiments, sharing a content item can include associating, using sharing module 810, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some embodiments, shared content items can be accessible to a recipient user without requiring authentication into a user account. This can include sharing module 810 providing access to a content item through activation of a link associated with the content item or providing access through a globally accessible shared folder.

The content can be stored in content storage 818, which is one means for performing this function. Content storage 818 can be a storage device, multiple storage devices, or a server. Alternatively, content storage 818 can be a cloud storage provider or network storage accessible via one or more communications networks. In one configuration, content management system 600 stores the content items in the same organizational structure as they appear on the client device. However, content management system 600 can store the content items in its own order, arrangement, or hierarchy.

Content storage 818 can also store metadata describing content items, content item types, and the relationship of content items to various accounts, folders, or groups. The metadata for a content item can be stored as part of the content item or can be stored separately. In one configuration, each content item stored in content storage 818 can be assigned a system-wide unique identifier.

Content storage 818 can decrease the amount of storage space required by identifying duplicate files or duplicate segments of files. Instead of storing multiple copies of an identical content item, content storage 818 can store a single copy and then use a pointer or other mechanism to link the duplicates to the single copy. Similarly, content storage 818 stores files using a file version control mechanism that tracks changes to files, different versions of files (such as a diverging version tree), and a change history. The change history can include a set of changes that, when applied to the original file version, produces the changed file version.

Content management system 600 automatically synchronizes content from one or more client devices, using synchronization module 812, which is one means for performing this function. The synchronization is platform agnostic. That is, the content is synchronized across multiple client devices 620 of varying type, capabilities, operating systems, etc. For example, client application 700 synchronizes, via synchronization module 812 at content management system 600, content in client device 620's file system with the content in an associated user account on system 600. Client application 700 synchronizes any changes to content in a designated folder and its sub-folders with the synchronization module 812. Such changes include new, deleted, modified, copied, or moved files or folders. Synchronization module 812 also provides any changes to content associated with client device 620 to client application 700. This synchronizes the local content at client device 620 with the content items at content management system 600.

Conflict management module 814 determines whether there are any discrepancies between versions of a content item located at different client devices 620. For example, when a content item is modified at one client device and a second client device, differing versions of the content item may exist at each client device. Synchronization module 812 determines such versioning conflicts, for example by identifying the modification time of the content item modifications. Conflict management module 814 resolves the conflict between versions by any suitable means, such as by merging the versions, or by notifying the client device of the later-submitted version.

A user can also view or manipulate content via a web interface generated by user interface module 802. For example, the user can navigate in web browser 760 to a web address provided by content management system 600. Changes or updates to content in content storage 818 made through the web interface, such as uploading a new version of a file, are synchronized back to other client devices 620 associated with the user's account. Multiple client devices 620 may be associated with a single account and files in the account are synchronized between each of the multiple client devices 620.

Content management system 600 includes communications interface 800 for interfacing with various client devices 620, and with other content and/or service providers via an Application Programming Interface (API), which is one means for performing this function. Certain software applications access content storage 818 via an API on behalf of a user. For example, a software package, such as an app on a smartphone or tablet computing device, can programmatically make calls directly to content management system 600, when a user provides credentials, to read, write, create, delete, share, or otherwise manipulate content. Similarly, the API can allow users to access all or part of content storage 818 through a web site.

Content management system 600 can also include authenticator module 806, which verifies user credentials, security tokens, API calls, specific client devices, etc., to determine whether access to requested content items is authorized, and is one means for performing this function. Authenticator module 806 can generate one-time use authentication tokens for a user account. Authenticator module 806 assigns an expiration period or date to each authentication token. In addition to sending the authentication tokens to requesting client devices, authenticator module 806 can store generated authentication tokens in authentication token database 820. After receiving a request to validate an authentication token, authenticator module 806 checks authentication token database 820 for a matching authentication token assigned to the user. Once the authenticator module 806 identifies a matching authentication token, authenticator module 806 determines if the matching authentication token is still valid. For example, authenticator module 806 verifies that the authentication token has not expired or was not marked as used or invalid. After validating an authentication token, authenticator module 806 may invalidate the matching authentication token, such as a single-use token. For example, authenticator module 806 can mark the matching authentication token as used or invalid, or delete the matching authentication token from authentication token database 820.

In some embodiments, content management system 600 includes a content management module 808 for maintaining a content directory that identifies the location of each content item in content storage 818, and allows client applications to request access to content items in the storage 818, and which is one means for performing this function. A content entry in the content directory can also include a content pointer that identifies the location of the content item in content storage 818. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Collaborative Content Management System

Figure 9:
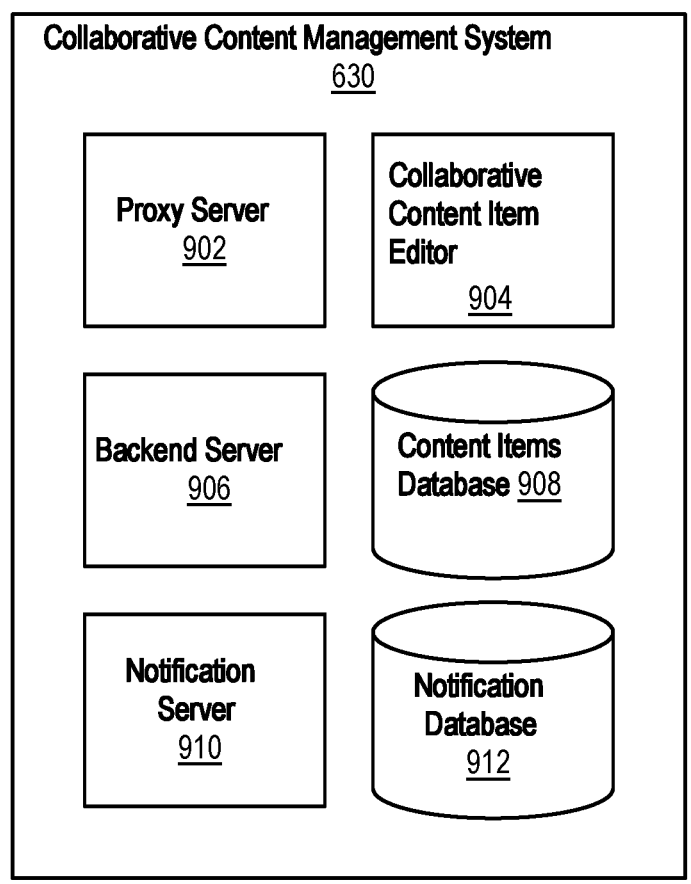
FIG. 9 is a schematic representation of a collaborative content management system, according to some embodiments.

FIG. 9 shows a block diagram of the collaborative content management system 630, according to one embodiment. Collaborative content items can be files that users can create and edit using a collaborative content items editor 760 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 620, using sharing 810 and synchronization 812 modules of content management system 600. Users operate client devices 620 to create and edit collaborative content items, and to share collaborative content items with other users of client devices 620. Changes to a collaborative content item by one client device 620 are propagated to other client devices 620 of users associated with that collaborative content item.

In the embodiment of FIG. 6, collaborative content management system 630 is shown as separate from content management system 600 and can communicate with it to obtain its services. In other embodiments, collaborative content management system 630 is a subsystem of the component of content management system 600 that provides sharing and collaborative services for various types of content items. User account database 816 and authentication token database 820 from content management system 600 are used for accessing collaborative content management system 630 described herein.

Collaborative content management system 630 can include various servers for managing access and edits to collaborative content items and for managing notifications about certain changes made to collaborative content items. Collaborative content management system 630 can include proxy server 902, collaborative content item editor 904, backend server 906, and notification server 910. Proxy server 902 handles requests from client applications 700 and passes those requests to the collaborative content item editor 904. Collaborative content item editor 904 manages application level requests for client applications 700 for editing and creating collaborative content items, and selectively interacts with backend servers 906 for processing lower level processing tasks on collaborative content items, and interfacing with collaborative content items database 908 as needed. Content items database 908 contains a plurality of database objects representing collaborative content items, comment threads, and comments. Notification server 910 detects actions performed on collaborative content items that trigger notifications, creates notifications in notification database 912, and sends notifications to client devices.

Client application 700 sends a request relating to a collaborative content item to proxy server 902. Generally, a request indicates the userID ("UID") of the user, and the collaborativeContentItemID ("NID") of the collaborative content item, and additional contextual information as appropriate, such as the text of the collaborative content item. When proxy server 902 receives the request, the proxy server 902 passes the request to the collaborative content item editor 904. Proxy server 902 also returns a reference to the identified collaborative content items server 904 to client application 700, so the client application can directly communicate with the collaborative content item editor 904 for future requests. In an alternative embodiment, client application 700 initially communicates directly with a specific collaborative content item 904 assigned to the userID.

When collaborative content item editor 904 receives a request, it determines whether the request can be executed directly or by a backend server 906. When the request adds, edits, or otherwise modifies a collaborative content item the request is handled by the collaborative content item editor 904. If the request is directed to a database or index inquiry, the request is executed by a backend server 906. For example, a request from client device 620 to view a collaborative content item or obtain a list of collaborative content items responsive to a search term does not modify collaborative content items and is processed by backend server 906.

Content management system 600 and collaborative content management system 630 may be implemented using a single computer, or a network of computers, including cloud-based computer implementations. The operations of content management system 600 and collaborative content management system 630 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Basic Hardware Machine

Referring now to FIG. 10, it is a schematic representation of a basic hardware machine 1000 with which some embodiments may be implemented. Hardware machine 1000 may be a component of an overall computing system configured to implement techniques, process, and methods described herein. The overall computing system may include one or more such hardware machines 1000.

Hardware machine 1000 and its hardware components, including their connections, relationships, and functions, is meant to be exemplary only, and not meant to limit implementations of an embodiment. Other hardware machines suitable for implementing an embodiment may have different components, including components with different connections, relationships, and functions.

Hardware machine 1000 may include bus 1002 or other communication mechanism for addressing main memory 1006 and for transferring data between and among the various components of hardware machine 1000.

Hardware machine 1000 may also include processor 1004 coupled with bus 1002 for processing information. Processor 1004 may be a general purpose microprocessor, a system on a chip (SoC), or other hardware processor.

Main memory 1006, such as a random access memory (RAM) or other dynamic storage device, also may be coupled to bus 1002 for storing information and software instructions to be executed by processor 1004. Main memory 1006 also may be used for storing temporary variables or other intermediate information during execution of software instructions to be executed by processor 1004.

Software instructions, when stored in storage media accessible to processor 1004, render hardware machine 1000 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Hardware machine 1000 also may include read only memory (ROM) 1008 or other static storage device coupled to bus 1002 for storing static information and software instructions for processor 1004.

Mass storage devices 1010 may be coupled to bus 1002 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 1010 may store a body of program and data for directing operation of hardware machine 1000, including an operating system, user application programs, driver and other support files, as well as other data files of all sorts.

Hardware machine 1000 may be coupled via bus 1002 to display 1012, such as a liquid crystal display (LCD) or other electronic visual display, for displaying information to a computer user. In a configuration, a touch sensitive surface incorporating touch detection technology (e.g., resistive, capacitive, etc.) may be incorporated within display 1012 to form a touch sensitive display for communicating touch gesture (e.g., finger or stylus) input to processor 1004.

Input device 1014, including alphanumeric and other keys, may be coupled to bus 1002 for communicating information and command selections to processor 1004. In addition to or instead of alphanumeric and other keys, input device 1014 may include one or more physical buttons or switches such as, for example, a power (on/off) button, a "home" button, volume control buttons, or the like.

Another type of user input device may be cursor control 1016, such as a mouse, a trackball, touchpad, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

While in a configuration, one or more of display 1012, input device 1014, and cursor control 1016 are external components (i.e., peripheral devices) of hardware machine 1000, some or all of display 1012, input device 1014, and cursor control 1016 are integrated as part of the form factor of hardware machine 1000 in a configuration.

Functions of the disclosed systems, methods, and modules may be performed by hardware machine 1000 in response to processor 1004 executing one or more programs of software instructions contained in main memory 1006. Such software instructions may be read into main memory 1006 from another storage medium, such as storage device 1010. Execution of the software instructions contained in main memory 1006 cause processor 1004 to perform the functions of an embodiment.

While functions and operations of an embodiment may be implemented entirely with software instructions, hard-wired or programmable circuitry of hardware machine 1000 (e.g., an ASIC, a FPGA, or the like) may be used in an embodiment in place of or in combination with software instructions to perform the functions, according to the requirements of the particular implementation at hand.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as a storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more software instructions to processor 1004 for execution. For example, the software instructions may initially be carried on a magnetic disk or solid-state drive of a remote computer. The remote computer can load the software instructions into its dynamic memory and send the software instructions over a data communications network. The hardware machine 1000 can receive the data over the data communications network and appropriate circuitry can place the data on bus 1002. Bus 1002 carries the data to main memory 1006, from which processor 1004 retrieves and executes the software instructions. The software instructions received by main memory 1006 may optionally be stored on storage device 1010 either before or after execution by processor 1004.

Hardware machine 1000 may include communication interface 1018 coupled to bus 1002. Communication interface 1018 provides a two-way data communication coupling to a wired or wireless network link 1020 that connects hardware machine 1000 to data communications network 1022 (e.g., a local area network (LAN), a wide area network (WAN), a wireless local area network (WLAN), a metropolitan area network (MAN), a storage area network (SAN), etc.). Network link 1020 typically provides data communication through network 1022 to one or more other data devices.

Communication interface 1018 may send and receive electrical, electromagnetic, or optical signals that carry digital data streams representing various types of information. For example, communication interface 1018 may be a wired network interface card, a wireless network interface card with an integrated radio antenna, or a modem.

For example, network link 1020 may provide a connection through network 1022 to a host computer or to data equipment operated by an Internet Service Provider (ISP). The ISP may in turn provide data communication services through the world wide packet data communication network now commonly referred to as the "Internet". Network 1022 and Internet use electrical, electromagnetic or optical signals that carry digital data streams. The signals through the various networks and the signals on network link 1020 and through communication interface 1018, which carry the digital data to and from hardware machine 1000, are example forms of transmission media.

Hardware machine 1000 can send messages and receive data, including program code, through network 1022, network link 1020, and communication interface 1018. In the Internet example, a server might transmit a requested code for an application program through Internet, ISP, and network 1022 and communication interface(s) 1018.

The received code may be executed by processor 1004 as it is received, and/or stored in storage device 1010, or other non-volatile storage for later execution.

Basic Software System

FIG. 11 is a block diagram of basic software system 1100 that may be employed for controlling the operation of hardware machine 1000. Software system 1100 may be a component of an overall computing system configured to implement techniques, processes, and methods described herein. The overall computing system may include one or more such software systems 1100 on one or more hardware machines 1000.

Software system 1100 and its software components, including their connections, relationships, and functions, is meant to be exemplary only, and not meant to limit implementations of an embodiment. Other software systems suitable for implementing an embodiment may have different components, including components with different connections, relationships, and functions.

Software system 1100 is provided for directing the operation of hardware machine 1000. Software system 1100, which may be stored in system memory (RAM) 1006 and on fixed storage (e.g., hard disk or flash memory) 1010, includes kernel or operating system (OS) 1110.

OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by hardware machine 1000. The applications or other software intended for use on hardware machine 1000 may also be stored as a set of downloadable computer-executable instructions, for example, for downloading and installation from an Internet location (e.g., a Web server, an app store, or other online service).

Software system 1100 includes graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. GUI 1115 also serves to display the results of operation from the OS 1110 and applications 1102, whereupon the user may supply additional inputs or terminate the session (e.g., log off).

OS 1110 and applications 1102 can execute directly on bare hardware 1120 (e.g., hardware machine 1000). Alternatively, a hypervisor or virtual machine monitor (VMM) 1130 may be interposed between the bare hardware 1120 and OS 1110. In this configuration, VMM 1130 acts as a software "cushion" or virtualization layer between the OS 1110 and bare hardware 1120.

VMM 1130 instantiates and runs one or more virtual machine instances. Each virtual machine comprises a "guest" operating system, such as OS 1110, and one or more applications, such as applications 1102, designed to execute on the guest operating system. 1130 presents the guest operating systems with a virtual operating platform and manages the execution of the guest operating systems.

In a configuration, VMM 1130 allows a guest operating system to run as if it is running on bare hardware 1120 directly. In these instances, the same version of the guest operating system configured to execute on bare hardware 1120 directly may also execute on VMM 1130 without modification or reconfiguration. In other words, VMM 1130 may provide full hardware and CPU virtualization to a guest operating system.

In a configuration, a guest operating system may be specially designed or configured to execute on VMM 1130. In these instances, the guest operating system is "aware" that it executes on a virtual machine monitor. In other words, VMM 1130 may provide para-virtualization to a guest operating system.

Extensions And Alternatives

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting 'at least one of' an element or another element refers to any possible permutation of the set of elements. For example, claim language reciting 'at least one of A and B' or 'at least one of A or B' means A, B, or both A and B."

In the foregoing specification, embodiments of the invention have been described with reference to numerous specific details that may vary from implementation to implementation. The specification and drawings are, accordingly, to be regarded in an illustrative rather than a restrictive sense.

The invention claimed is:

1. A method, performed by a computing system having one or more processors and memory, comprising:
   determining that a first text sequence, entered via user input inline with content of a content item, matches a predetermined text sequence;
   based on the determining that the first text sequence matches the predetermined text sequence, interpreting a second text sequence, entered via user input inline with content of the content item, as a user selection of a particular command to insert, inline with content of the content item, a task description and a checkbox that is linked to a task at a third-party task management service, wherein the interpreting the second text sequence comprises determining a function that is mapped to the particular command;
   interpreting a third text sequence, entered via user input inline with content of the content item, as a particular task description;
   initiating the function;
   based on the initiating the function, replacing, at a particular location inline with content of the content item, (a) the first text sequence, the second text sequence, and the third text sequence with (b) the particular task description and a particular checkbox that is linked to a particular task of the third-party task management service such that the content item no longer contains, at the particular location, (a) the first text sequence, the second text sequence, and the third text sequence and instead contains (b) the particular task description and the particular checkbox that is linked to the particular task of the third-party task management service; and wherein updating the particular checkbox updates a status of the particular task at the third-party task management service by sending a network message, reflecting the status update, from the computing system to the third-party task management service.

2. The method of claim 1, wherein interpreting the third text sequence as the particular task description is based on a determination that the function takes a parameter.

3. The method of claim 1, further comprising updating the particular checkbox based on detecting a user interaction with the particular checkbox, wherein the user interaction updates the particular checkbox by toggling the particular checkbox.

4. The method of claim 1, wherein said replacing comprises inserting the particular checkbox and the particular task description into the content item displayed in an editing area of a graphical user interface.

5. The method of claim 1, wherein, responsive to an update of the status of the task at the third-party task management service, the third-party task management service notifies one or more users that are registered with the third-party task management service to receive notification when the task is completed.

6. The method of claim 1, further comprising:
receiving a first input and displaying, in an editing area of a graphical user interface, the first text sequence corresponding to the first input; and
receiving a second input and displaying, in the editing area, the second text sequence corresponding to the second input;
wherein the editing area is displayed in a web browser window.

7. The method of claim 1, wherein: the user input that causes the second text sequence to be entered inline with content of the content item comprises a selection of a particular selectable item, of a list of selectable items corresponding to a plurality of predetermined commands.

8. The method of claim 7, further comprising:
wherein the predetermined text sequence indicates a beginning of an inline command expression inline with content of the content item;
wherein the inline command expression is displayed within an editing area of a graphical user interface; and
causing a graphical user interface element, containing the list of selectable items, to be displayed within the editing area such that the graphical user interface element displayed does not visibly obstruct the inline command expression.

9. The method of claim 8, wherein a border of the graphical user interface element is displayed within the editing area in a text editing line immediately preceding or immediately following a text editing line containing the inline command expression.

10. The method of claim 8, further comprising:
causing a plurality of selectable items to be displayed, the plurality of selectable items corresponding to a plurality of predetermined commands;
wherein a particular selectable item of the plurality of selectable items corresponds to the particular command; and
wherein the particular selectable item visibly indicates a name of the particular command and visibly indicates that the function takes a parameter.

11. The method of claim 1, wherein the interpreting the second text sequence as a user selection of the particular command is based on a user input that enters the second text sequence in an editing area of a graphical user interface immediately following the predetermined text sequence in the editing area.

12. The method of claim 1, further comprising:
receiving, at the computing system, a network message from the third-party task management service, the network message reflecting a current status of the task at the third-party task management service; and
updating the particular checkbox to reflect the current status of the task at the third-party task management service.

13. The method of claim 12, wherein receiving the network message reflecting the current status from the third-party task management service is performed when the content item is loaded for display.

14. A computing system, comprising:
at least one memory; and
one or more processors;
wherein the at least one memory includes instructions that, when executed by the one or more processors, cause the computing system to perform operations comprising:
determining that a first text sequence, entered via user input at a particular location inline with content of a content item, matches a predetermined text sequence;
based on the determining that the first text sequence matches the predetermined text sequence, interpreting a second text sequence, entered via user input inline with content of the content item, as a user selection of a particular command to insert, inline with content of the content item, a task description and a checkbox that is linked to a task at a third-party task management service, wherein the interpreting the second text sequence comprises determining a function that is mapped to the particular command;
initiating the function;
wherein a particular task description is entered into a particular interface that is one of: a pop-up, an overlay, or an iframe window;
wherein the particular interface is driven by the third-party task management service; and
based on the initiating the function, inserting, at the particular location inline with content of the content item in an editing area displayed in a graphical user interface, a representation of an output of the function that comprises the particular task description and a particular checkbox that is linked to a particular task at the third-party task management service,
wherein updating the particular checkbox updates a status of the particular task at the third-party task management service by sending a network message, reflecting the status update, from the computing system to the third-party task management service.

15. The computing system of claim 14, wherein the instructions comprise instructions that, when executed by the one or more processors, cause the computing system to perform operations comprising:
receiving a first input and displaying, in the editing area, the first text sequence corresponding to the first input; and
receiving a second input and displaying, in the editing area, the second text sequence corresponding to the second input;
wherein the editing area is displayed in a web browser window.

16. The computing system of claim 14, wherein: the user input that causes the second text sequence to be entered inline with content of the content item comprises a selection of a particular selectable item, of a displayed list of selectable items corresponding to a plurality of predetermined commands.

17. The computing system of claim 16, wherein the instructions comprise instructions that, when executed by the one or more processors, cause the computing system to perform operations comprising:
wherein the predetermined text sequence indicates a beginning of an inline command expression inline with content of the content item;
wherein the inline command expression is displayed within the editing area; and
causing a graphical user interface element, containing the list of selectable items, to be displayed within the editing area such that the graphical user interface element displayed does not visibly obstruct the inline command expression.

18. The computing system of claim 14, wherein the interpreting the second text sequence as a user selection of the particular command is based on a user input that enters the second text sequence in the editing area immediately following the predetermined text sequence in the editing area.

19. One or more non-transitory storage media storing one or more sequences of instructions that, when executed by a computing system comprising one or more processors, cause:
determining that a first text sequence, entered via user input inline with content of a content item, matches a predetermined text sequence;
based on the determining that the first text sequence matches the predetermined text sequence, interpreting a second text sequence, entered via user input inline with content of the content item, as a user selection of a particular command to insert, inline with content of the content item, a task description and a checkbox that is linked to a task at a third-party task management service, wherein the interpreting the second text sequence comprises determining a function that is mapped to the particular command;
interpreting a third text sequence, entered via user input inline with content of the content item, as a particular task description;
initiating the function;
based on the initiating the function, replacing, at a particular location inline with content of the content item, (a) the first text sequence, the second text sequence, and the third text sequence with (b) the particular task description and a particular checkbox that is linked to a particular task of the third-party task management service such that the content item no longer contains, at the particular location, (a) the first text sequence, the second text sequence, and the third text sequence and instead contains (b) the particular task description and the particular checkbox that is linked to the particular task of the third-party task management service; and
wherein updating the particular checkbox updates a status of the particular task at the third-party task management service by sending a network message, reflecting the status update, from the computing system to the third-party task management service.

20. The one or more non-transitory storage media of claim 19, wherein interpreting the third text sequence as the particular task description is based on a determination that the function takes a parameter.

21. The one or more non-transitory storage media of claim 19, wherein the one or more sequences of instructions further comprise instructions that, when executed by the computing system, cause updating the particular checkbox based on detecting a user interaction with the particular checkbox, wherein the user interaction updates the particular checkbox by toggling the particular checkbox.

22. The one or more non-transitory storage media of claim 19, wherein said replacing comprises inserting the particular checkbox and the particular task description into the content item displayed in an editing area of a graphical user interface.

23. The one or more non-transitory storage media of claim 19, wherein, responsive to an update of the status of the task at the third-party task management service, the third-party task management service notifies one or more users that are registered with the third-party task management service to receive notification when the task is completed.

24. The one or more non-transitory storage media of claim 19, wherein the one or more sequences of instructions further comprise instructions that, when executed by the computing system, cause:
receiving a first input and displaying, in an editing area of a graphical user interface, the first text sequence corresponding to the first input; and
receiving a second input and displaying, in the editing area, the second text sequence corresponding to the second input;
wherein the editing area is displayed in a web browser window.

25. The one or more non-transitory storage media of claim 19, wherein:
the user input that causes the second text sequence to be entered inline with content of the content item comprises a selection of a particular selectable item, of a list of selectable items corresponding to a plurality of predetermined commands;
the predetermined text sequence indicates a beginning of an inline command expression inline with content of the content item;
the inline command expression is displayed within an editing area of a graphical user interface; and
the one or more sequences of instructions further comprise instructions that, when executed by the computing system, cause a graphical user interface element, containing the list of selectable items, to be displayed within the editing area such that the graphical user interface element displayed does not visibly obstruct the inline command expression.

26. The one or more non-transitory storage media of claim 19, wherein the one or more sequences of instructions further comprise instructions that, when executed by the computing system, cause:
causing a plurality of selectable items to be displayed, the plurality of selectable items corresponding to a plurality of predetermined commands;
wherein a particular selectable item of the plurality of selectable items corresponds to the particular command; and
wherein the particular selectable item visibly indicates a name of the particular command and visibly indicates that the function takes a parameter.

27. The one or more non-transitory storage media of claim 19, wherein the interpreting the second text sequence as a user selection of the particular command is based on a user input that enters the second text sequence in an editing area of a graphical user interface immediately following the predetermined text sequence in the editing area.

28. The one or more non-transitory storage media of claim 19, wherein the one or more sequences of instructions further comprise instructions that, when executed by the computing system, cause:
   receiving, at the computing system, a network message from the third-party task management service, the network message reflecting a current status of the task at the third-party task management service; and
   updating the particular checkbox to reflect the current status of the task at the third-party task management service.

29. The one or more non-transitory storage media of claim 28, wherein receiving the network message reflecting the current status from the third-party task management service is performed when the content item is loaded for display.

* * * * *